(12) United States Patent
McCorkle

(10) Patent No.: US 7,177,341 B2
(45) Date of Patent: Feb. 13, 2007

(54) ULTRA WIDE BANDWIDTH NOISE CANCELLATION MECHANISM AND METHOD

(75) Inventor: John W. McCorkle, Vienna, VA (US)

(73) Assignee: Freescale Semiconductor, Inc., Austin, TX (US)

(*) Notice: Subject to any disclaimer, the term of this patent is extended or adjusted under 35 U.S.C. 154(b) by 999 days.

(21) Appl. No.: 09/972,966

(22) Filed: Oct. 10, 2001

(65) Prior Publication Data

US 2002/0064245 A1 May 30, 2002

Related U.S. Application Data

(60) Provisional application No. 60/238,466, filed on Oct. 10, 2000.

(51) Int. Cl.
H04B 1/00 (2006.01)

(52) U.S. Cl. .................. 375/130; 375/148; 375/240.19; 375/316; 375/346; 455/63.1; 455/67.13; 455/114.2; 455/271

(58) Field of Classification Search ................ 375/130, 375/136, 141, 147, 295, 316, 354, 148, 346, 375/240.19; 455/63.1, 67, 114.2, 27, 501
See application file for complete search history.

(56) References Cited

U.S. PATENT DOCUMENTS

| | | | |
|---|---|---|---|
| 4,979,186 A | | 12/1990 | Fullerton .................... 375/259 |
| 5,510,800 A | * | 4/1996 | McEwan .................... 342/387 |
| 5,677,743 A | * | 10/1997 | Terao et al. ................ 348/735 |
| 5,812,081 A | | 9/1998 | Fullerton .................... 342/21 |
| 5,890,051 A | * | 3/1999 | Schlang et al. .............. 455/76 |
| 5,901,183 A | * | 5/1999 | Garin et al. ................ 375/343 |
| 6,249,445 B1 | * | 6/2001 | Sugasawa .................... 363/60 |
| 6,304,623 B1 | * | 10/2001 | Richards et al. ............ 375/355 |
| 6,351,246 B1 | | 2/2002 | McCorkle |
| 6,505,032 B1 | | 1/2003 | McCorkle |
| 6,700,939 B1 | | 3/2004 | McCorkle |
| 6,735,238 B1 | | 5/2004 | McCorkle |
| 2002/0075976 A1 | * | 6/2002 | Richards et al. ............ 375/354 |
| 2002/0102987 A1 | * | 8/2002 | Souisse et al. .............. 455/454 |

(Continued)

FOREIGN PATENT DOCUMENTS

WO    WO 96 35278 A    11/1996

OTHER PUBLICATIONS

Win, M. Z. et al, "Ultra-Wide Bandwidth Time-Hopping Spread-Spectrum Impulse Radio For Wireless Multiple-Access Communications," IEEE Transactions on Communications, IEEE Inc., New York, U.S., vol. 48, No. 4, Apr. 2000, pp. 679-691, XP000932191, ISSN: 0090-6778.

(Continued)

Primary Examiner—Chieh M. Fan
Assistant Examiner—Ted M. Wang

(57) ABSTRACT

A mechanism and method are provided for self-canceling noise generated in a UWB receiver and for providing multi-mode operation for the receiver. Noise is canceled by generating a first set of wavelets in a same phase as an incoming signal, and a second set of wavelets with an opposite phase as the incoming signal. The received signal and the generated wavelets are mixed and the result integrated such that the integrated output tends to zero. The multiple modes of operation allow the receiver to process multiple types of waveforms. The modes may be chosen by a user-selected switch, a waveform-detection based switch, or the like.

9 Claims, 15 Drawing Sheets

U.S. PATENT DOCUMENTS

2003/0161411 A1* 8/2003 McCorkle et al. .......... 375/295

OTHER PUBLICATIONS

Luise M. et al., "Clock Synchronization for Wavelet-Based Multirate Transmissions," IEEE Transactions on Communications, IEEE Inc., New York, U.S., vol. 48, No. 6, Jun. 2000, pp. 1047-1054, XP000954431, ISSN: 0090-6778.
U.S. Appl. No. 60/207,225, filed May 26, 2000, McCorkle.
U.S. Appl. No. 60/217,099, filed Jul. 10, 2000, Miller.
U.S. Appl. No. 09/633,815, filed Aug. 7, 2000, McCorkle.
U.S. Appl. No. 09/684,401, filed Oct. 10, 2000, Miller.
U.S. Appl. No. 09/684,782, filed Oct. 10, 2000, McCorkle.
U.S. Appl. No. 09/685,195, filed Oct. 10, 2000, Miller.
U.S. Appl. No. 09/685,196, filed Oct. 10, 2000, Miller.
U.S. Appl. No. 09/685,197, filed Oct. 10, 2000, Miller.
U.S. Appl. No. 09/685,198, filed Oct. 10, 2000, McCorkle.
U.S. Appl. No. 09/685,199, filed Oct. 10, 2000, McCorkle.
U.S. Appl. No. 09/685,200, filed Oct. 10, 2000, McCorkle.
U.S. Appl. No. 09/685,202, filed Oct. 10, 2000, Rofheart.
U.S. Appl. No. 09/685,203, filed Oct. 10, 2000, Miller.
U.S. Appl. No. 09/685,205, filed Oct. 10, 2000, McCorkle.

* cited by examiner

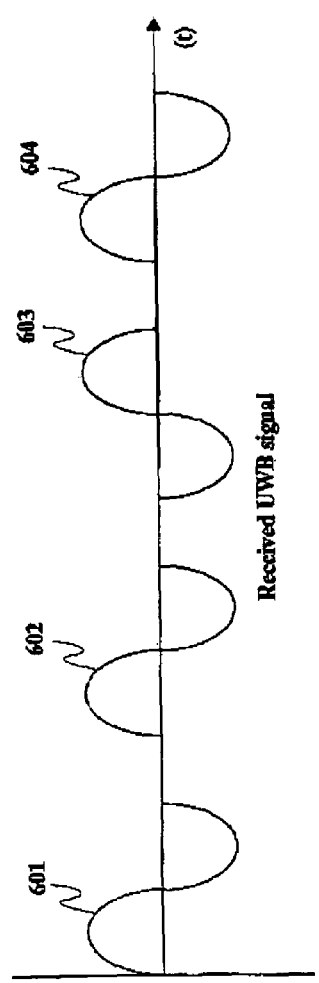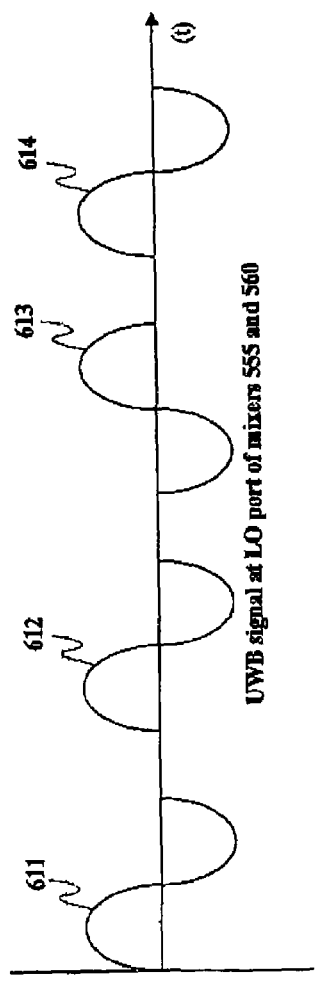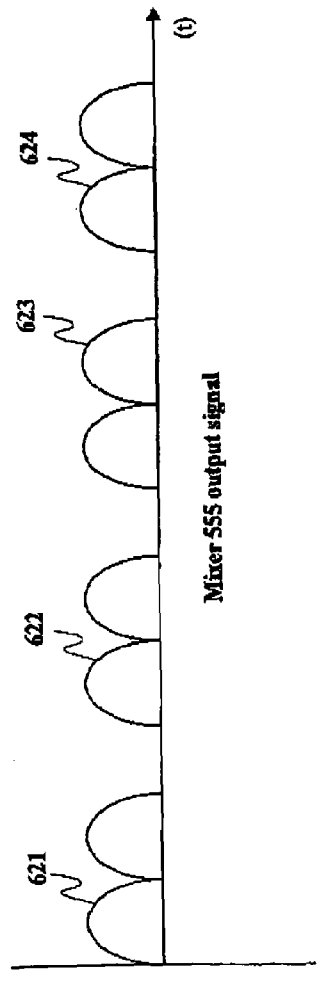

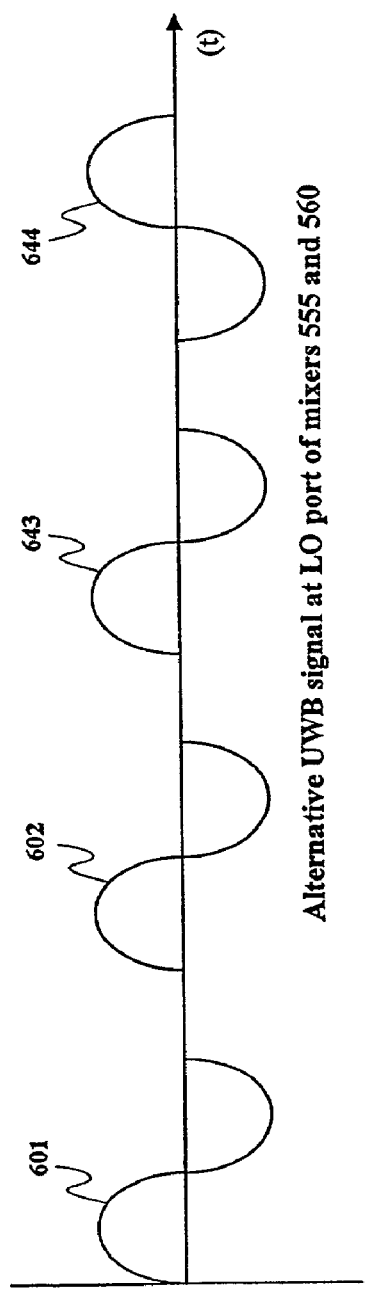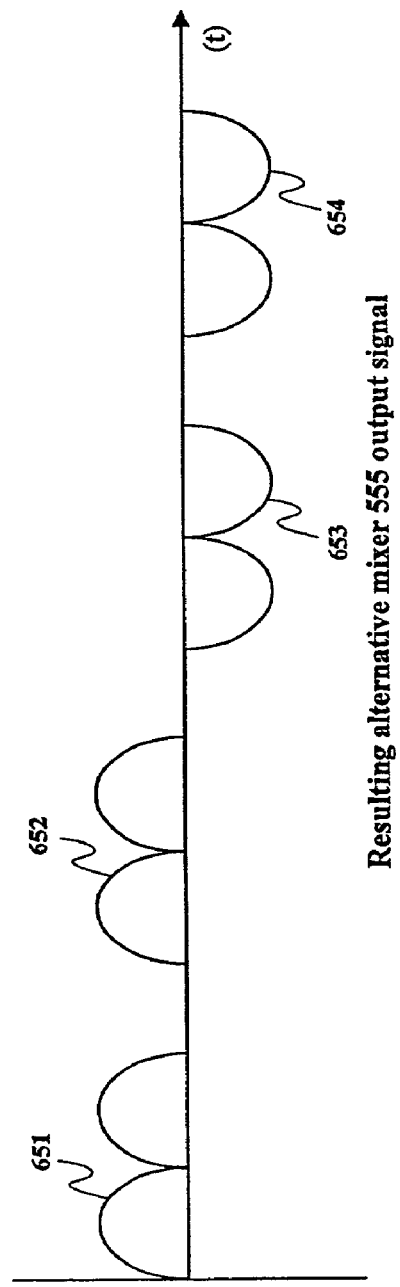

ULTRA WIDE BANDWIDTH NOISE CANCELLATION MECHANISM AND METHOD

CROSS-REFERENCE TO RELATED PATENT DOCUMENTS

This application claims priority under 35 U.S.C. §119(e) to Provisional Application Ser. No. 60/238,466, filed Oct. 10, 2000, entitled "ULTRA WIDE BANDWIDTH NOISE CANCELLATION MECHANISM AND METHOD." In particular, this application is a continuation-in-part of Provisional Application Ser. No. 60/238,466, entitled "ULTRA WIDE BANDWIDTH NOISE CANCELLATION MECHANISM AND METHOD."

The present document contains subject matter related to that disclosed in commonly owned, co-pending application Ser. No. 09/078,616 filed May 14, 1998, entitled ULTRA WIDE BANDWIDTH SPREAD SPECTRUM COMMUNICATIONS SYSTEM; U.S. Ser. No. 09/633,815 filed Aug. 7, 2000 entitled ELECTRICALLY SMALL PLANAR UWB ANTENNA; application Ser. No. 09/563,292, filed May 3, 2000 entitled PLANAR UWB ANTENNA WITH INTEGRATED TRANSMITTER AND RECEIVER CIRCUITS; application Ser. No. 09/685,198 filed Oct. 10, 2000, entitled ANALOG SIGNAL SEPARATOR FOR UWB VERSUS NARROWBAND SIGNALS; application Ser. No. 60/238,466 filed Oct. 10, 2000, entitled ULTRA WIDE BANDWIDTH NOISE CANCELLATION MECHANISM AND METHOD; application Ser. No. 60/217,099 filed Jul. 10, 2000 entitled MULTIMEDIA WIRELESS PERSONAL AREA SYSTEM NETWORK (WPAN) PHYSICAL LAYER SYSTEM AND METHOD; application Ser. No. 09/685,203 filed Oct. 10, 2000, entitled SYSTEM AND METHOD FOR BASEBAND REMOVAL OF NARROWBAND INTERFERENCE IN ULTRA WIDEBAND SIGNALS; application Ser. No. 09/685,197 filed Oct. 10, 2000, entitled MODE CONTROLLER FOR SIGNAL ACQUISITION AND TRACKING IN AN ULTRA WIDEBAND COMMUNICATION SYSTEM; application Ser. No. 09/684,400 filed Oct. 10, 2000, entitled ULTRA WIDEBAND COMMUNICATION SYSTEM, METHOD, AND DEVICE WITH LOW NOISE PULSE FORMATION; application Ser. No. 09/685,195 entitled ULTRA WIDE BANDWIDTH SYSTEM AND METHOD FOR FAST SYNCHRONIZATION; application Ser. No. 09/684,401 filed Oct. 10, 2000, entitled ULTRAWIDE BANDWIDTH SYSTEM AND METHOD FOR FAST SYNCHRONIZATION USING SUB CODE SPINS; application Ser. No 09/685,196 filed Oct. 10, 2000, entitled ULTRA WIDE BANDWIDTH SYSTEM AND METHOD FOR FAST SYNCHRONIZATION USING MULTIPLE DETECTION ARMS; application Ser. No. 09/685,199 filed Oct. 10, 2000, entitled A LOW POWER, HIGH RESOLUTION TIMING GENERATOR FOR ULTRA-WIDE BANDWIDTH COMMUNICATIONS SYSTEMS; application Ser. No. 09/685,202 filed Oct. 10, 2000, entitled METHOD AND SYSTEM FOR ENABLING DEVICE FUNCTIONS BASED ON DISTANCE INFORMATION; and application Ser. No. 09/685,201 filed Oct. 10, 2000, entitled CARRIERLESS ULTRAWIDEBAND WIRELESS SIGNALS FOR CONVEYING APPLICATION DATA, where each of the above-identified applications include at least one of J. McCorkle and T. Miller as an inventor, and the entire contents of each of the above-identified documents being incorporated herein by reference.

BACKGROUND OF THE INVENTION

The present invention relates to radio receivers, transceivers, systems and methods employing wireless digital communications using ultra wide bandwidth (UWB) signaling techniques, and other communication waveforms. More particularly, the present invention relates to multi-mode communication systems in which one of the modes employs UWB waveforms.

UWB waveforms are used in a form of communication in which energy is spread in frequency over a much greater bandwidth than with conventional narrowband communication systems such as television broadcast systems, or even traditional spread-spectrum communication systems. For a general discussion of UWB communications as well as other UWB systems, see the above-identified related patent application documents.

FIG. 1 is a generalized spectral plot of energy verses frequency showing how UWB compares with conventional communication schemes. In particular, FIG. 1 shows a conventional narrowband communications signal (NB3) 105, a conventional spread spectrum communications signal (SS2) 110, and a UWB communications signal (UB1) 115.

As shown in FIG. 1, a conventional narrowband communications signal 105 occupies a relatively narrow frequency. In this category, a television signal occupies a relatively large bandwidth and is representative of one of the widest bandwidth signals that is still characterized as a conventional narrowband signal. The signal spectrum from a conventional spread-spectrum signal 110 occupies a greater bandwidth than a conventional narrowband communications signal 105, but at a lower power spectral density (PSD), i.e., at a lower amount of energy per hertz.

A UWB signal 115 occupies a much greater bandwidth than either a conventional narrowband communications signal (NB3) 105 or a conventional spread spectrum communications signal (SS2) 110. However, as seen in FIG. 1, a UWB signal 115 also has a much lower PSD than either of these other signal types. This can lead to several problems.

First, as recognized by the present inventor, because the bandwidth is so broad in a UWB receiver, it is common to employ a direct conversion receiver architecture. However, when there is local oscillator leakage (radiated or conducted), that leakage often manifests itself either as direct radiated emissions or a leak that is in some way coupled into the front-end circuitry so as to contaminate the intended energy coupled into the signal path. Moreover, in direct conversion receivers (i.e., those without intermediate frequencies, or with a single mixer for converting from RF to baseband), there is the additional problem of the local oscillator producing a radiated emission that may be coupled back through the receiving antenna and serve as a self-jamming signal. This local oscillator may radiate emissions that fall "in band" with the received signal and are coupled through the receiving antenna, being detected and much stronger than the desired signal.

One conventional technique for eliminating this problem is to employ a significant amount of shielding around the local oscillator circuitry to avoid direct radiation from the circuitry reaching the receiving antenna. Another is to minimize the opportunities for feedback loops within the receiver, thus limiting possible occurrences of self-interference.

A common way of mitigating the resulting interference is to assume that it is unchanging, and subtracting the error that is likewise unchanging. In addition, however, a problem that arises when the emissions are radiated is that the emissions can first reflect off moving objects near the antenna, such as individuals or devices, and then be coupled back into the receiver's antenna. When these reflections are present, the energy of the reflected emissions tends to vary in magnitude and phase. Accordingly, the unwanted self-noise is often not constant, but variable in time, causing a bias level of the receiver's detector to vary. This makes self-noise detection and mitigation more complex and increases the difficulty in obtaining satisfactory performance from the device.

Moreover, the output of a conversion mixer, which is used to perform direct signal conversion, will contain both the intended signal as well as the reflected signal. These two signals may be added coherently, giving rise to a bias term. Because the unintended signals may come from reflections off moving objects, the bias term is not steady, but rather "noisy."

Second, it is desirable to build a multi-mode radio that can easily operate in multiple modes, including both ultra wide bandwidth signaling and various narrowband-signaling signaling schemes. For example, it would be advantageous to get economies of scale, to mass produce a radio that could operate not only in a UWB mode, but also in, for example, an IEEE 802.11b mode, or an IEEE 802.11.a mode, or an IEEE 802.15.1 mode, or an IEEE 802.15.3 mode, etc. so that users could operate in a multitude of various environments without requiring a different piece of equipment for each one. It would also be advantageous for the radio to be software programmable, so that as new communications equipment is introduced, the radio could be programmed to receive the signal without requiring an entirely new radio transmitter, receiver or transceiver to be developed.

SUMMARY OF THE INVENTION

Consistent with the title of this section, only a brief description of selected features of the present invention is now presented. A more complete description of the present invention is the subject of this entire document.

In view of the above-identified limitations with conventional systems, an object of the present invention is to address the above-identified limitations and other limitations of conventional systems.

Another object of the present invention is to provide a mechanism for self-canceling noise generated from oscillators within a UWB receiver.

Another object of the present invention is to provide a multi-mode transmitter and receiver that, in at least in one mode, is configured to transmit and receive and process bi-polar UWB signals.

Another object of the present invention is to provide a multi-mode transmitter and receiver that, in at least in one mode, is configured to transmit and receive and process frequency modulated, frequency hopped spread-spectrum signals.

Another object of the present invention is to provide a multi-mode transmitter and receiver that, in at least in one mode, is configured to transmit and receive and process any form of modulation under software control.

The foregoing and other objects and advantages of the invention will become apparent from the following description. In this description, reference is made to the accompanying drawings, which form a part of the description. The descriptions and drawings of the preferred embodiments below are shown by way of illustration, however, and not limitation. Such description does not represent the full extent of the invention. Rather the invention may be employed in different arrangements in alternate embodiments.

In one embodiment of the present invention, an agile clock generator is used to produce a base clock signal at a frequency higher than that required for any reception mode. The high-frequency clock signal is then divided by a small shielded divider circuit to produce one or more divided clock signals that are localized immediately at the mixer and no where else, such that they are inhibited from radiating to any other parts of the circuitry or the antenna, and being particularly well suited for particular modes of reception.

Furthermore, when receiving UWB signals, the mixer may not use, at its local oscillator (LO) port, an exact copy of the signal sent from the transmitter in order to correlate it with the received signal. Instead, the generated LO signal may have some bi-phase modulated symbols inverted. The integration result, of the resulting correlated received and generated LO signals, will tend to be zero, allowing it to be AC coupled to eliminate bias drift problems and rejecting the reception of a signal leaking from the LO, yet by obtaining intermediate integration results, the signal processor can be programmed to demodulate the desired signal.

Furthermore, when receiving frequency-modulation (FM) signals, the mixer may not use at its local oscillator (LO) port, the output of a bi-phase wavelet generator, as is the case for a bi-phase modulated UWB radio, but instead use an agile oscillator that can be tuned or hopped or modulated as required to synthesize the required FM. The resulting correlated received and generated LO signals, will be, under software control, filtered and digitized wherein a signal processor is programmed to demodulate the desired signal.

Furthermore, the clock used to generate the UWB bi-phase chipping rate can be one and the same agile oscillator as is used in the FM transceiver mode, making use of the same electronic components in either mode.

Furthermore, the digitizing electronics circuits can be one and the same circuit used for any of the modes of operation.

Furthermore, by using one and the same circuits for the FM and UWB modes, the radio can be manufactured at no greater cost, and the resulting radio uses no more power than one built specifically for a single mode of operation.

Furthermore, only an additional A/D converter is required to allow arbitrarily modulated transmitter waveforms to be generated under software control, yet it can be turned off to eliminate its impact on battery life for all modes where it is not needed.

In accordance with these and other objects, a UWB self-noise cancellation mechanism is provided for reducing performance degradation as a result of self-generated noise. The UWB self-noise cancellation mechanism comprises a pulse-forming network for producing an internally-generated UWB bi-phase signal having a first arranged pattern; a mixer for multiplying the UWB bi-phase signals with an incoming RF UWB signal having a second set pattern; and an integrator for accumulating an output of the mixer, wherein the first arranged pattern comprises a first set of bi-phase wavelets and an adjacent second set of bi-phase wavelets, wherein the second arranged pattern comprises a third set of bi-phase wavelets and an adjacent fourth set of bi-phase wavelets, wherein the first set of bi-phase wavelets and the third set of bi-phase wavelets are the same in wave shape and polarity, and wherein the second set of bi-phase wavelets and the fourth set of bi-phase wavelets are the same in wave shape, but are inverted in polarity.

The first and third sets of bi-phase wavelets each preferably comprise two wavelets, and the second and third sets of bi-phase wavelets each preferably comprise two wavelets. In addition, the first, second, third, and fourth sets of bi-phase wavelets all preferably have equal number of wavelets.

The UWB self-noise cancellation mechanism may further comprise an antenna for receiving the incoming RF UWB signal. The UWB self-noise cancellation mechanism may also further comprise a front-end circuit located between the antenna and the mixer for processing the incoming RF UWB signal. The front-end circuit may include one of a low noise amplifier, an automatic gain control circuit, and a stub circuit.

The UWB self-noise cancellation mechanism may further comprise an analog-to-digital converter for converting the output of the integrator into a digital signal.

A UWB self-noise cancellation mechanism in a UWB receiver is also provided that comprises means for producing an internally-generated UWB bi-phase signal having a first arranged pattern; means for receiving an incoming RF signal having a second arranged pattern; means for combining the internally-generated UWB bi-phase signal and the incoming RF signal to produce an output; and means for integrating the output of the combining means over a length of time that corresponds with the first and second arranged patterns such that an integration output approaches zero when the incoming RF signal is aligned in phase with the internally-generated UWB bi-phase signal.

Also in accordance with these and other objects of the invention, a mode selection mechanism is provided that comprises a clock signal generator for generating a base clock signal at a base clock frequency; a first divide circuit for dividing the base clock signal by a first integer value M to generate a first clock signal having a first clock frequency equal to the base clock frequency divided by M; a second divide circuit for dividing the base clock signal by a second integer value N to generate a second clock signal having a second clock frequency equal to the base clock frequency divided by N; and a switch for selecting the first clock signal when a first receive mode of operation is selected, and for selecting the second clock signal when a second receive mode of operation is selected.

The first receive mode is preferably a UWB receive mode. The base clock frequency is preferably about 4.8 GHz. The first integer value M is preferably equal to 3, and the second integer value N is preferably equal to 2.

A mode selection mechanism in a signal receiver is also provided, comprising a mode selector for selecting a receive mode of operation for a received signal; an agile clock for providing a base clock signal at a base clock frequency; a frequency divider means for dividing the frequency of the base clock frequency by an integer corresponding to the selected receive mode to generate a divided clock signal having a divided clock frequency; and a signal processor for processing the received signal with the divided clock signal. The selected receive mode of operation is preferably a UWB mode.

The frequency divider may further comprise a first frequency dividing unit, corresponding to a first receive mode, for dividing the frequency of the base clock frequency by a first integer to generate a first divided clock signal having a first divided clock frequency; and a second frequency dividing unit, corresponding to a second receive mode, for dividing the frequency of the base clock frequency by a second integer to generate a second divided clock signal having a second divided clock frequency. The first integer is preferably 2 and the second integer is preferably 3.

A mode selection mechanism in a multi-mode radio receiver is also provided, comprising: means for selecting a receive mode of operation; means for providing a base clock signal at a base clock frequency; means for dividing the frequency of the base clock frequency by an integer corresponding to the selected receive mode to generate a divided clock signal having a divided clock frequency; and means for processing a received signal with the divided clock signal. The selected receive mode of operation is preferably a UWB mode.

A multi-mode radio receiver is also provided, comprising: a mode selection mechanism including an agile clock for producing a base clock signal at a base clock frequency, a first divide circuit for dividing the base clock signal by a first integer to generate a first divided clock signal at a first divided clock frequency, a second divide circuit for dividing the base clock signal by a second integer to generate a second divided clock signal at a second divided clock frequency, and a switch for providing a selected clock signal, the selected clock signal being the first divided clock signal when a first receive mode of operation is selected, and the second divided clock signal when a second receive mode of operation is selected; and a UWB self-noise cancellation mechanism including a pulse forming network for producing a series of UWB bi-phase signals based on the selected clock signal, a mixer for combining the series of UWB bi-phase signals with an incoming RF signal, and an integrator configured to accumulate an output of the mixer.

The first integer is preferably 2 and the second integer is preferably 3. The first receive mode of operation is preferably a UWB mode.

A method of operating a multi-mode radio receiver is provided, comprising: generating a base clock signal at a base clock frequency; dividing the base clock signal by a first integer to generate a first divided clock signal at a first divided clock frequency if a first receive mode is determined; and dividing the base clock signal by a second integer to generate a second divided clock signal at a second divided clock frequency if a second receive mode is determined. The first integer is preferably 2 and the second integer is preferably 3. The first receive mode of operation is preferably a UWB mode.

BRIEF DESCRIPTION OF THE DRAWINGS

FIGS. 6A–6E are graphs of various waveforms showing how a bias term due to LO radiation feedback may be eliminated according to a method employed by preferred embodiments of the present invention;

DETAILED DESCRIPTION OF THE PREFERRED EMBODIMENTS

Figure 2:
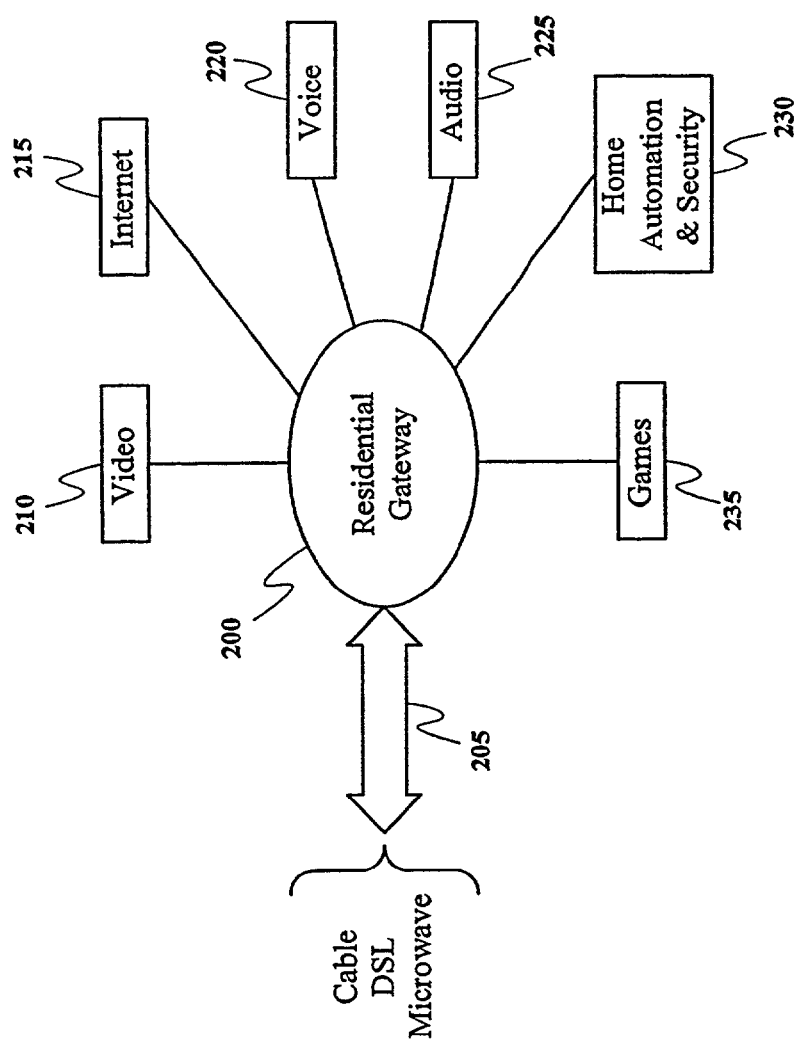
FIG. 2 is a block diagram showing how a transceiver employing a UWB radio according to a preferred embodiment of the present invention may facilitate wireless communications between different appliances and external communication networks by way of a residential gateway.

A UWB receiver and/or transceiver (sometimes called a UWB radio) according to preferred embodiments of the present invention may be incorporated into a residential gateway 200 as shown in FIG. 2. The gateway 200 could potentially serve as a hub for UWB communications with a variety of electronic devices.

Since a UWB radio as disclosed in the preferred embodiments below is particularly well suited for limited range, broad bandwidth, high data rate communication it could be implemented in a variety of devices, especially consumer devices. Such devices would benefit by conveying information in a convenient and fast manner via wireless communications from one location to the next. In particular, it would be particularly advantageous if these devices could communicate with the residential gateway 200, which could coordinate their action with a remote source (not shown) over a carrier 205, e.g., a cable provider, digital subscriber line, or microwave link.

Some examples of devices that might advantageously use a UWB radio to communicate with a residential gateway are digital video devices 210, Internet-enabled appliances 215, voice transmission devices 220, audio transmission devices 225, home automation and security devices 230, and games 235. This list is not meant to be exhaustive, however, and other devices could easily be used as well.

Digital video devices 210 could communicate digitized video data to the residential gateway 200 for distribution to the remote source over the carrier 205, or to another video device 210 set apart from the first device. For example, a DVD player might send video data to the residential gateway 200, which in turn sends the video data to a nearby monitor for viewing.

Internet enabled appliances 215 could convey information to the remote source and receive information from the remote source via the carrier 205. This would allow for more convenience through effectively wireless Internet access.

Voice transmission devices 220 could convey voice data to the remote source and receive voice data from the remote source via the residential gateway 200 and carrier 205, e.g., as with an Internet telephone. Or the voice transmission device 220 could simply transmit and receive voice data to and from another local voice transmission device 220 via the residential gateway 200, e.g., as with a home intercom system.

Audio players 225 such as MP3 players might transmit and receive audio data to and from the residential gateway. As above, this data could be transmitted to/from the remote source via the carrier 205, or might simply be transmitted to/from another local audio device 225.

Similarly, a receiver according to preferred embodiments of the present invention may be employed in home automation and security devices 230 where it would be beneficial to conveniently and quickly communicate information wirelessly from a remote location to a central monitoring station. Such a monitoring station could be contiguous with the residential gateway 200 or could be a separate unit.

Games 235 and other devices, where data is exchanged between different processors, can also be conveniently handled by a UWB radio according to preferred embodiments of the present invention. As noted above, these devices could communicate with remote devices through the residential gateway 200 and the carrier 205, or could communicate with other local devices via the residential gateway 200 alone.

As these examples show, the operational environment for a system that employs a UWB radio according to preferred embodiments of the present invention will often be in the presence of active indoor environments, such as a house or office space. In these environments, the transmitters will broadcast signals at relatively low power levels per hertz, and the communication channel will involve mobile obstacles, such a people. Accordingly, energy coupled into the receiver's antenna will include dynamic multi-path components.

Figure 3:
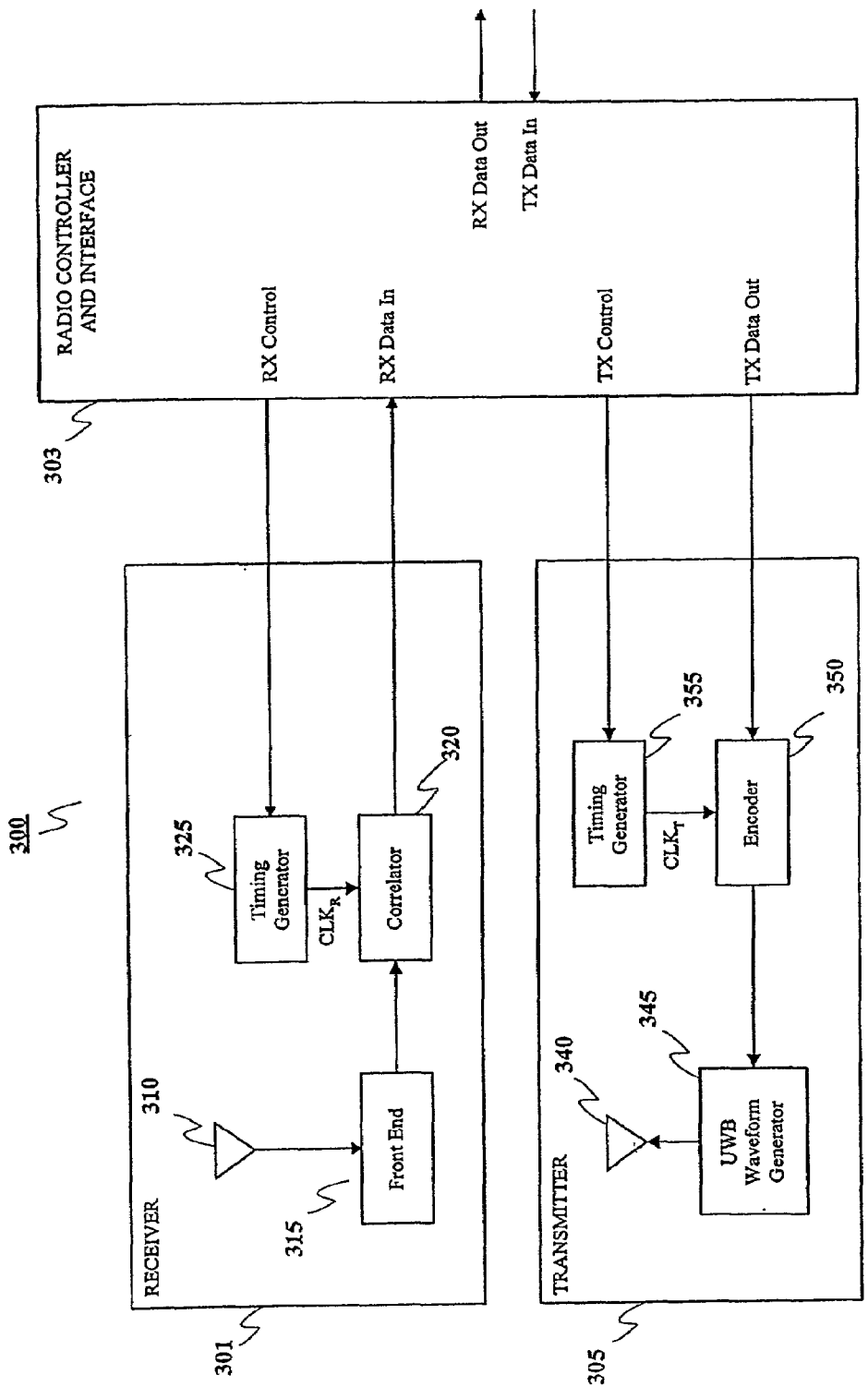
FIG. 3 is a block diagram of a UWB transceiver according to a preferred embodiment of the present invention.

FIG. 3 is a block diagram of a UWB transceiver according to preferred embodiments of the present invention. As shown in FIG. 3, the UWB transceiver 300 includes a receiver 301, a radio controller and interface 303, and a transmitter 305. The receiver 301 includes a receiving antenna 310, a front end 315, a UWB waveform correlator 320, and a timing generator 325. The transmitter 305 includes a transmitting antenna 340, a UWB waveform generator 345, an encoder 350, and a timing generator 355.

The radio controller and interface 303 serves as an media access control (MAC) interface between the UWB wireless communication functions implemented by the receiver 301 and transmitter 305, and applications that use the UWB communications channel for exchanging data with remote devices. Although the transceiver 300 is disclosed as having a separate receiver 301 and transmitter 305, in alternate embodiments these could be combined into a single unit.

During the receive mode of operation, the receiver 301 receives externally generated UWB electromagnetic waveforms. The receiving antenna 310 converts the UWB electromagnetic waveforms into an electrical signal (or an optical signal) for subsequent processing. The UWB signal itself may be any one of a number of UWB waveforms, including: (1) bi-phase modulated signals (+1, −1), (2) multilevel bi-phase signals (+1, +a, −a, −1), (3) quadrature phase signals (+1, −1, +j, −j), (4) multilevel quadrature phase signals (+1, j), (−1, j), (+a, −aj) . . . , (5) pulse position modulation (PPM) signals (same shape pulses transmitted in different candidate time slots), and (6) any combination of the above waveforms, such as bi-phase channel symbols transmitted according to a PPM signaling scheme.

The electrical signals coupled in through the receiving antenna 310 are passed to the radio front end 315. Depending on the type of waveform, the radio front end 315 processes the electric signals so that the level of the signal and the spectral components of the signal are suitable for processing in the UWB waveform correlator 320.

The UWB waveform correlator 320 correlates the incoming signal with different candidate signals generated by the receiver 301 so as to determine when the receiver 301 is synchronized with the received signal. The timing generator 325 operates under control of the radio controller and interface 303 to provide a receiver clock signal $CLK_R$, which is used in the correlation process performed in the UWB waveform correlator 320. Moreover, the UWB waveform correlator 320 time aligns a particular pulse sequence produced at the receiver 301, with the received pulse sequence that was received through the receiving antenna 310.

When the two sequences are correlated with one another, the UWB waveform correlator 320 provides high signal-to-noise ratio data to the radio controller and interface 303 for subsequent processing. In some circumstances the output of the UWB waveform correlator 320 is the data itself; in other circumstances the UWB waveform correlator 320 simply provides correlation results to the radio controller and interface 303, which itself does additional signal processing to derive the data. The signal processing may include a plurality of combinations of a plurality of signal processing algorithms, for example, estimating the mean and variance of the one and zero data clusters in order to adaptively set the decision threshold, or implementing additional integration to reduce noise, or implementing soft or hard error correction decoding, or training and applying an adaptive equalizer to mitigate multipath and antenna placement effects. The radio controller and interface 303, determines when a signal has enough strength to provide an adequately low bit error rate (BER), at which point it determines it has finished acquiring synchronization and it then begins to simply track the incoming signal to maintain synchronization.

In selected embodiments, when synchronization is not achieved (i.e., during a signal acquisition mode of operation), the radio controller and interface 301 provides a control signal to the timing generator 325 so as to adjust the phase and/or frequency of the output of the timing generator 325, thus sliding a correlation window within the UWB waveform correlator 320 until a signal of sufficient strength is found and it becomes locked in the proper position.

The radio controller and interface 303 is preferably a processor-based unit that is implemented either with hard wired logic such as in an application-specific integrated circuit (ASIC), or in a programmable processor.

Once synchronized, the receiver 301 provides data to the radio controller and interface 303, which in turn passes the data out for use in an external process through a "data out" line, under the control of an "interface control" bus. The external process may be any one of a number of processes performed with data that is either received via the receiver 301, or transmitted by the transmitter 305 to a remote receiver.

During a transmit mode of operation, the radio controller and interface 303 receives source data from an external source and applies the data to the encoder 350. The radio controller and interface 303 also provides a control signal to the timing generator 355 for use in identifying the signaling sequence of UWB pulses. The timing generator 355 then generates a transmitter clock signal CLKT, which is used to properly synchronize an outgoing signal.

The encoder 350 receives the data from the radio controller and interface 303 and the transmitter clock signal $CLK_T$ from the timing generator 355 and preprocesses the data so as to provide a timing input for the UWB waveform generator 345 to produce UWB pulses encoded in shape, or time and shape, to convey the data to a remote location. The shapes include, (1) bi-phase modulated signals (+1, −1), (2) multilevel bi-phase signals (+1, +a, −a, −1), (3) quadrature phase signals (+1, −1, +j, −j), (4) multilevel quadrature phase signals (+1, j), (−1, j), (+a, −aj) . . . , (5) pulse position modulation (PPM) signals (same shape pulses transmitted in different candidate time slots), and (6) any combination of the above waveforms, such as bi-phase channel symbols transmitted according to a PPM signaling scheme.

The encoder 350 may also provide some identification of the source from which the data comes (such as user ID). In one embodiment, this user ID may be inserted in the transmission sequence as if it were a header of an information packet. In other embodiments, the user ID itself may be employed to encode the data in blocks, such that the receiver receiving the transmission would need to have a priori knowledge of the user ID in order to make sense of the data. The output from the encoder 350 is applied to the UWB waveform generator 345. The UWB waveform generator 345 may produce a UWB pulse sequence of one of any number of different schemes.

In one modulation scheme the data may be encoded using the relative spacing of transmission pulses, i.e., pulse position modulation (PPM). In other UWB communication schemes where it is possible to manipulate the shape of the pulses, the data may be encoded by exploiting the shape of the pulses. As noted above, examples include, a binary phase signal set, quadrature phase signal set, or even a multilevel signal set as it is in the case of multi-level bi-phase modulation or even multilevel quadrature phase modulation.

Furthermore it should be noted that the present invention is able to combine the use of PPM with other modulation schemes that manipulate the shape of the pulses. In this way, more data bits may be contained per channel symbol transmitted from the transmitter 305. There are numerous advantages to this approach including having a greater number of bits per hertz transmitted, as well as the possibility of reducing the amount of transmit power per channel symbol required to transmit a predetermined amount of data. The output from the UWB generator 345 is then provided to the transmitting antenna 340, which then transmits the UWB energy to an external receiver.

Figure 4:
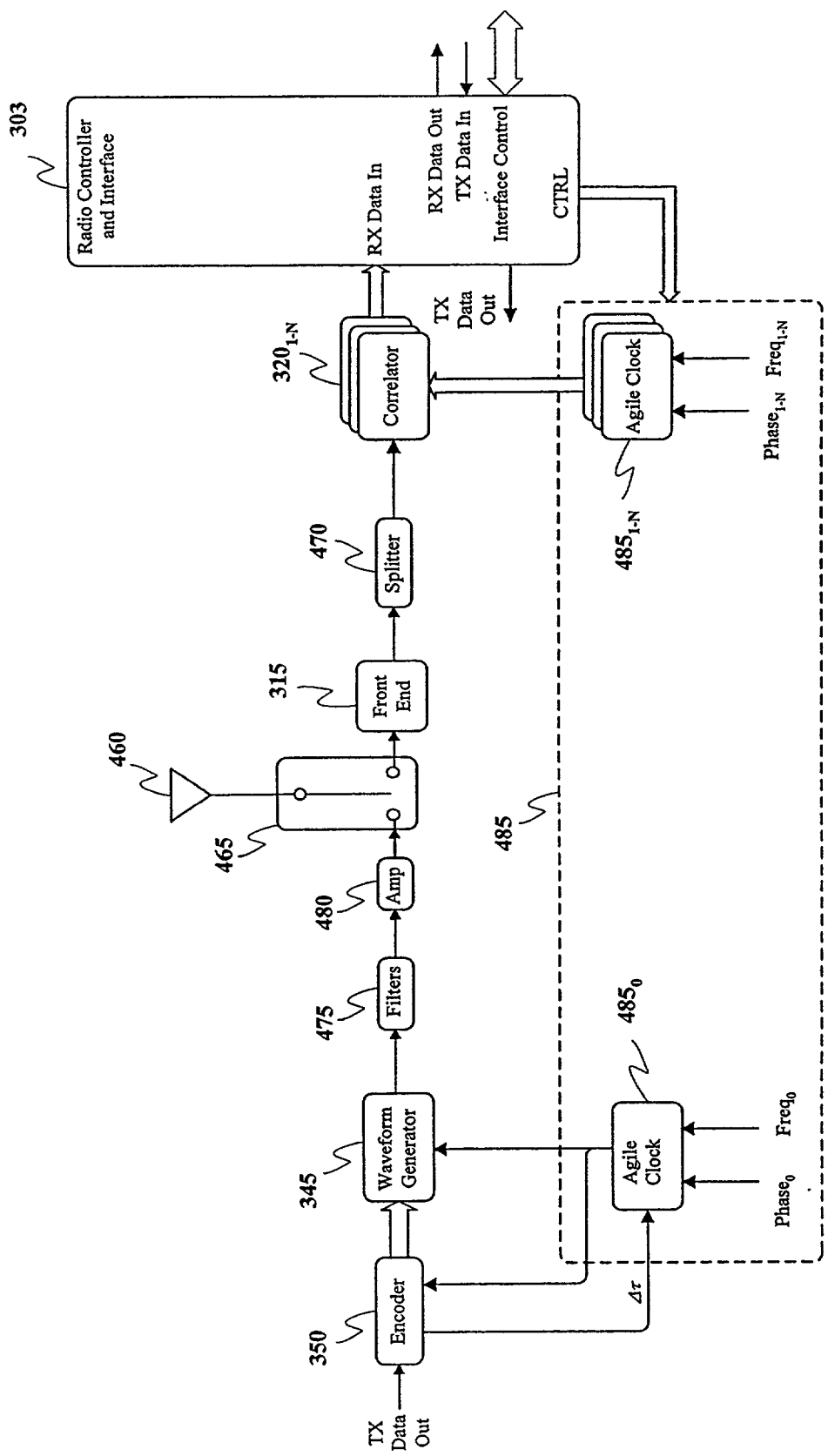
FIG. 4 is a block diagram of a transceiver according to another preferred embodiment of the present invention in which the modulation scheme employed is able to manipulate the shape of UWB pulses.

As noted above, although a separate receiver 301 and transmitter 305 are shown in FIG. 3, the receiver and transmitter functions may use joint resources such as a common timing generator and/or a common antenna in alternate embodiments. FIG. 4 is a block diagram of a transceiver embodiment of the present invention in which just such a common timing generator and/or a common antenna is employed.

As shown in FIG. 4, the UWB transceiver includes an antenna 460, a transmit/receive (T/R) switch 465, a front end 315, splitter 470, a plurality of correlators $320_1$–$320_N$, a radio controller and interface 303, an encoder 350, a waveform generator 345, a set of filters 475, an amplifier 480, and a timing generator module 485. The timing generator module 485 includes an output-timing generator $485_0$, and a plurality of input timing generators $485_1$–$485_N$. This embodiment allows multiple fingers (also called arms) to correlate, simultaneously, several time-offset copies of the code with the incoming signal. This simultaneity both increases the speed and efficiency of acquisition and tracking, as well as providing RAKE capabilities to increase the SNR. RAKE is a term used to describe the coherent combining of energy from a plurality of multi-path induced replicas of the desired signal.

The T/R switch 465 connects the antenna 460 to either the amplifier 480, or the front end 315, depending upon whether the transceiver is transmitting or receiving. In alternate embodiments separate transmitting and receiving antennas could be used.

When receiving energy through the antenna 460, the received energy is coupled into the T/R switch 465, which passes the energy to a radio front end 315 as an incoming signal. The radio front end 315 filters, extracts noise, and adjusts the amplitude of the incoming signal before providing the same to the splitter 470.

The splitter 470 divides the incoming signal up into N copies of the incoming signal and applies the N incoming signals to different correlators $320_1$–$320_N$. Each of the correlators $320_1$–$320_N$ receives a clock input signal from a respective input timing generator $485_1$–$485_N$ of a timing generator module 485 as shown in FIG. 4. Each of these correlators corresponds to a different finger of the transceiver.

The timing generators $485_1$–$485_N$ receive a phase and frequency adjustment signal, as shown in FIG. 4, but may also receive a fast modulation signal or other control signals as well. The radio controller and interface 303 may also provide control signals (e.g., phase, frequency and fast modulation signals, etc.) to the timing generator module 485 for time synchronization and modulation control. The fast modulation control signal may be used to implement, for example, chirp waveforms, PPM waveforms, such as fast time scale PPM waveforms, etc.

The radio controller and interface 303 also provides control signals to, for example, the encoder 350, the waveform generator 345, the filter set 475, the amplifier 480, the T/R switch 465, the front end 315, the correlators $320_1$–$320_N$ (corresponding to the UWB waveform correlator 320 of FIG. 3), etc., for controlling, for example, amplifier gains, signal waveforms, filter passbands and notch functions, alternative demodulation and detecting processes, user codes, spreading codes, cover codes, etc.

During signal acquisition, the radio controller and interface 303 adjusts the phase input of the first input timing generator $485_1$, to allow the first tracking correlator $320_1$ to try and identify and match the timing of the signal produced at the receiver with the timing of the arriving signal. When the received signal and the locally generated signal coincide in time with one another, the radio controller and interface 303 senses the high signal strength or high SNR and begins to track, at which point the receiver is considered synchronized with the received signal.

Once synchronized, the receiver will operate in a track mode, where the first input timing generator $485_1$ is adjusted by way of a continuing series of phase adjustments to counteract any differences in timing of the first input timing generator $485_1$ and the incoming signal. By sensing the mean of the phase adjustment rate over a known period of time, the radio controller and interface 303 can adjust the frequency of the first input timing generator $485_1$ so that the mean rate of the phase adjustments becomes zero.

The frequency is adjusted in this instance because it is clear from the pattern of phase adjustments that there is a frequency offset between the first input timing generator $485_1$ and the clocking of the received signal. Similar operations may be performed on the second through $N^{th}$ input timing generators $485_2$–$485_N$, so that each finger of the receiver can recover the signal delayed by different amounts, such as the delays caused by multipath (i.e., scattering along different paths via reflecting off of local objects).

A feature of the transceiver in FIG. 4 is that it includes a plurality of tracking correlators $320_1$–$320_N$. By providing a plurality of correlators, several advantages are obtained. First, it is possible to achieve synchronization more quickly (i.e., by operating parallel sets of correlation fingers to find strong SNR points over different code-wheel segments). Second, during a receive mode of operation, the multiple fingers can resolve and lock onto different multipath components of a signal. Through coherent addition, the UWB communication system uses the energy from the different multipath signal components to reinforce the received signal, thereby improving signal-to-noise ratio. Third, by providing a plurality of tracking correlator fingers, it is also possible to use one or more fingers to continuously scan the channel for a better signal than is being received on other fingers.

In one embodiment of the present invention, if and when a scanning finger finds a multipath term with higher SNR than another finger that is being used to demodulate data, the role of the fingers is switched (i.e., the finger with the higher SNR is used to demodulate data, while the finger with the lower SNR begins searching). In this way, the communications system dynamically adapts to changing channel conditions, yet at extremely low cost in power or money since a high-speed signal processor is not required.

The radio controller and interface 303 receives the information from the different correlators $320_1$–$320_N$ and decodes the data. The radio controller and interface 303 also provides control signals for controlling the front end 315, e.g., such as gain, filter selection, filter adaptation, etc., and adjusting the synchronization and tracking operations by way of the timing generator module 485.

In addition, the radio controller and interface 303 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 4, an output timing generator $485_0$ receives phase, frequency, and/or fast modulation adjustment signals for use in encoding a UWB waveform from the radio controller and interface 303. Data and user codes (via a control signal) are provided to the encoder 350. In an embodiment using time-modulation, command signals (e.g., Δt) are passed to the output-timing generator $485_0$ for providing the time at which to send a pulse. In an embodiment using PPM, data is passed to the timing generator $485_0$ that provides a predetermined time delay at which a pulse will be sent. Regardless, in this way the encoding of the data into the transmitted waveform may be performed.

When the shape of the different pulses are modulated according to the data or data and codes, the encoder 350 produces the command signals as a way to select different shapes for generating particular waveforms in the waveform generator 345, as well as for setting the transmitted amplitude. For example, the data may be grouped into multiple data bits per channel symbol. The waveform generator 345 then produces the requested waveform at a particular time as indicated by the timing generator $485_0$. The output of the waveform generator is then filtered in the filter set 475 and amplified in the amplifier 480 before being transmitted via antenna 460 by way of the T/R switch 465. Amplitude control is advantageous because when units are close to each other, the amplitude can be reduced so that the emissions have less likelihood of causing interference to any other radio system.

In an alternate embodiment of the present invention, the transmit power is set low enough that the transmitter and receiver are simply alternately powered down without need for the T/R switch 465. Also, in some embodiments of the present invention, neither the filter set 475 nor the amplifier 480 are needed, because the desired power level and spectrum are directly useable from the waveform generator 345. In addition, the filter set 475 and the amplifier 480 may be included in the waveform generator 345 depending on the implementation of the present invention.

A feature of the UWB communications system disclosed, is that a transmitted waveform can be made to have a nearly continuous power flow, for example, by using a high chipping rate so that the individual wavelets in the waveform are placed nearly back-to-back. This configuration allows the system to operate at low peak voltages, yet produce ample average transmit power to operate effectively. As a result, sub-micron geometry CMOS switches, for example, running at one-volt levels, can be used to directly drive the antenna 460 such that the amplifier 480 is not required. In this way, the entire radio can be integrated onto a single monolithic integrated circuit.

As noted, under certain operating conditions, the system can be operated without the filter set 475. If, however, the system is to be operated with another radio system, the filter set 475 can be used to provide a notch function to limit interference with other radio system. In this way, the system can operate simultaneously with other radio systems, providing advantages over conventional devices that use avalanching type devices connected straight to an antenna, such that it is difficult to include filters therein.

Figure 5:
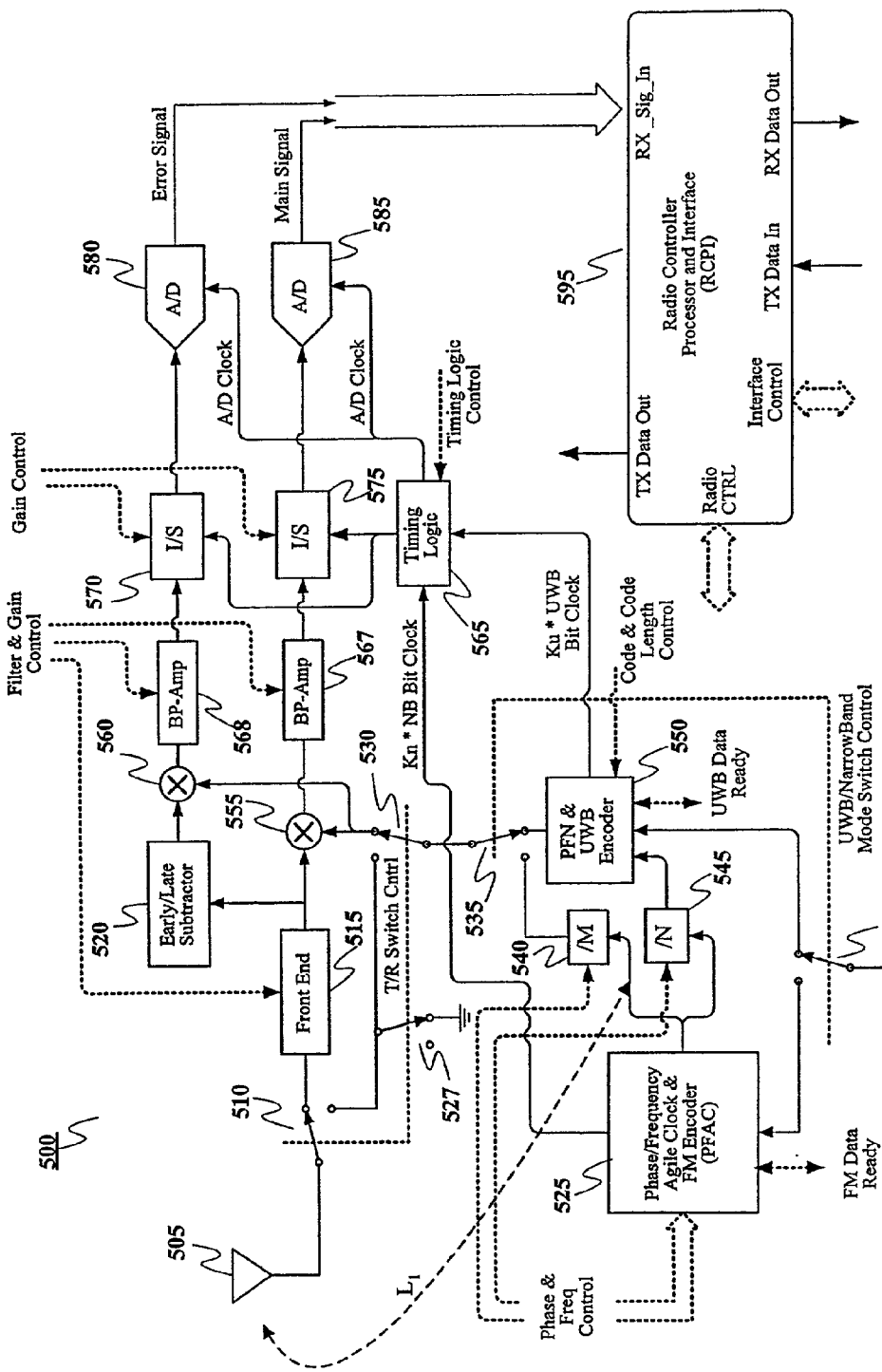
FIG. 5 is a block diagram of a multi-mode selecting transmitter/receiver that also cancels LO radiation feedback according to preferred embodiments of the present invention.

FIG. 5 is a block diagram of a transceiver according to a preferred embodiment of the present invention that shows in more detail how the self-noise cancellation feature and mode selector are employed. As shown in FIG. 5, the transceiver 500 includes an antenna 505, an antenna switch 510, a front end 515, an early/late subtraction circuit 520, a phase/frequency agile clock and FM encoder (PFAC) 525, a shunt switch 527, first and second signal switches 530 and 535, first and second divide circuit 540 and 545, a TX data switch 547, a UWB pulse forming network (PFN) and encoder 550, a main mixer 555, an error mixer 560, timing logic 565, a main error band-pass variable gain and bandwidth amplifier (main BP amplifier) 567, an error band-pass variable gain and bandwidth amplifier (error BP amplifier) 568, an error channel integrator/sample circuit 570, a main channel integrator/sample circuit 575, an error channel A/D converter 580, a main channel A/D converter 585, and a radio controller/processor and interface (RCPI) unit 595. In FIG. 5, control signal paths are shown as dotted lines, data signal paths and timing signal paths are shown as solid lines, and signal leakage paths are shown as dashed lines.

The antenna 505 operates in a receive mode to convert received UWB electromagnetic waveforms into an electrical signal (or an optical signal) for subsequent processing, and operates in a transmit mode to convert an electrical signal (or an optical signal) into an electromagnetic waveform. The antenna 505 is connected via the antenna switch 510 to either the front end 515 during a receive operation, or to the PFN 550 via the first and second signal switches 530 and 535 during a transmit operation.

In this embodiment the front end 515 preferably contains a tunable filter and low noise amplifier (LNA) with gain control, although this can be varied in alternate embodiments. The front end 515 receives the signal from the antenna 505 (via the antenna switch 510) and operates to cancel unwanted, in-band radio frequency interference. The early/late subtraction circuitry 520 receives the output of the front end 515 and operates to produce an error signal proportional to the offset in time between the incoming signal and pulse timing at the mixers 555 and 560. The error signal is derived from the PFAC 525, which in turn is controlled by a feedback loop through the RCPI unit 595.

The antenna switch 510, the shunt switch 527, and the first signal switch 530 operate in response to a single T/R switch control signal to select a transmit or receive mode. In the receive mode, the antenna switch 510 is connected to the front end 515, the shunt switch 527 is connected to ground to improve the isolation of the antenna 505, and the first signal switch 530 is connected to the mixers 555 and 560. In this case the first signal switch 530 sends a modulated waveform to the LO ports of mixers 555 and 560.

In the transmit mode, the antenna switch 510 and the first signal switch 530 are connected to each other, and the shunt switch 527 is connected to an open circuit. In this case the first signal switch 530 sends a modulated waveform to the antenna 505 via the antenna switch 510.

The second signal switch 535 and the TX data switch 547 determine the operation mode of the transceiver 500, either a UWB mode or a narrowband (NB) mode, and thus the source of the modulated waveform mentioned above. In a UWB mode, the second signal switch 535 is connected to the PFN 550 to select the use of a UWB signal, and the TX data switch 547 is connected to the PFN 550. In an NIB mode, the second signal switch 535 is connected to the first divide circuit 540 to select the use of a relatively narrow band signal, and the TX data switch 547 is connected to the PFAC 525. Thus in a UWB mode the PFN 550 provides a modulated pulse stream to the second signal switch 535, and in an NB mode the first divide circuit 540 provides either an FM signs or a tone to the second signal switch 535.

The PFAC 525 provides a steady base clock signal that may be used for the reception of the incoming signal, e.g., 4.8 GHz in one preferred embodiment. The first and the second divide circuits 540 and 545 receive the base clock signal from the agile clock 525 and divide this clock output by set integer amounts M and N to generate the first and second divided clock signals, respectively. In the embodiment described below, M=2 and N=3, though these numbers could be varied as needed.

The first divide circuit 540 outputs a first divided clock signal with a frequency (1/M) times that of the base clock signal (one-half in the described embodiment), and the second divide circuit 545 outputs a second divided clock signal with a frequency (1/N) times that of the base clock signal (one-third in the described embodiment). Thus, if M=2, N=3, and the PFAC 525 provides a base clock signal at 4.8 GHz, the first divide circuit 540 provides a first divided clock signal at 2.4 GHz, and the second divide circuit 545 provides a second divided clock signal at 1.6 GHz. In alternate embodiments with different values for M and N, the outputs of the first and second divide circuits 540 and 545 would vary accordingly.

The first divide circuit 540 provides the first divided clock signal to the main channel mixer 555 and the error channel mixer 560, when connected by the first and second signal control switches 530 and 535. The first divided clock signal is then used for the conversion of the waveform received from the front end 515. The second divide circuit 545 provides the second divided clock signal to the PFN 550.

The PFN 550 receives the second divided clock signal from the second divide circuit 545 to establish the output pulse times, and the TX data signal and a code and code-length control signal from RCPI 595. Based on these signals, the PFN 550 produces a signal consisting of a series of UWB bi-phase pulses. When the second signal switch 535 is set for UWB mode and first signal switch 530 is set to receive mode, the signal produced by the PFN 550 is mixed with the incoming RF signals in the main channel mixer 555, and is mixed with the RF error signal in error mixer 560.

The main mixer 555 receives a copy of the incoming signal filtered through the front end 515 and mixes it with another signal received from the first signal switch 530. The identity of the other signal depends upon the setting of the second signal switch 535. If the second signal switch 535 is set to an NB mode, the mixed signal will be the first divided clock signal from the first dividing circuit 540. If the second signal switch 535 is set to a UWB mode, the mixed signal will be the UWB bi-phase signal output from the PFN 550. The output of the main mixer 555 is provided to the main integrator/sampler circuit 575, but has its DC portion blocked by the main BP amplifier 567. Since any LO leakage correlates to a DC value through this mixer, and DC is not passed, LO leakage errors do not propagate to the A/D converters 580 and 585, where the data is fully demodulated.

The timing logic 565 receives a timing clock signal from the PFAC 525 and a timing logic control signal, and provides both a timing signal to the error channel and main channel integrator/sampler circuits 570 and 575, and an time-aligned A/D clock signal (e.g., at 200 MHz) to the an error channel and main channel A/D converters 580 and 585.

The main channel integrator/sampler circuit 575 receives the AC portion of the output of the main mixer 555 and the timing signal from the timing logic 565. Based on these signals, the main channel integrator/sample circuit 575 integrates the main signal over a full bit-period centered on the incoming bit energy, holds the analog value to allow the A/D converter 585 a full bit-period to digitize the value, and then discharges. The main channel A/D converter 585 then converts the integrated main signal to a digital value and provides that value to the RCPI 595.

The error channel mixer 560 receives a copy of the same input signal received by the main channel mixer 555 (i.e., the UWB bi-phase signals from the PFN 550 or the second divided clock signal from the second divider 540) and a copy of the incoming signal that has been differenced by the early/late subtractor 520 and mixes these two signals.

Figure 10A:
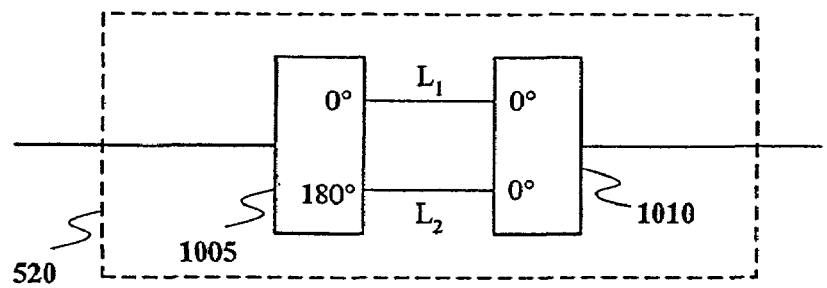
FIGS. 10A, 10B, and 10C are circuit diagrams showing preferred embodiments of the early/late subtraction block of FIG. 5.
Figure 10B:
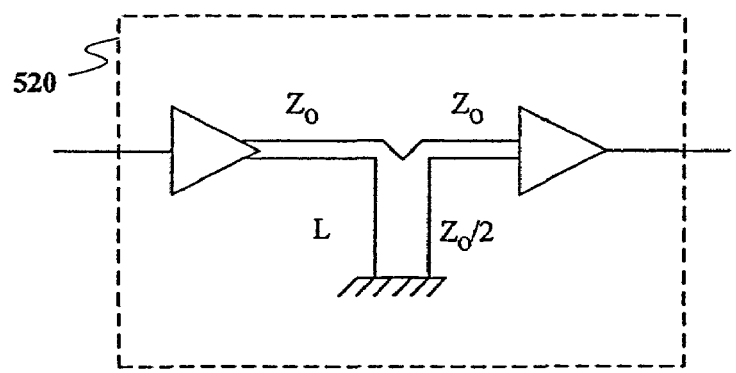
Figure 10C:
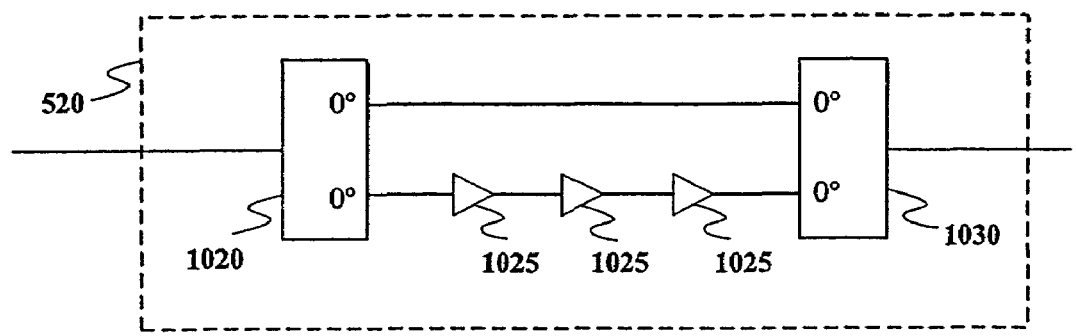

FIGS. 10A to 10C show three different embodiments for the early/late subtractor 520. As shown in FIGS. 10A to 10C, the early/late subtractor 520 subtracts two copies of the input signal where the first is slightly earlier than the signal at the input to main mixer 555, and the second is delayed so it is slightly later than the signal at the input to main mixer 555; hence the name "early/late subtraction."

Figure 1:
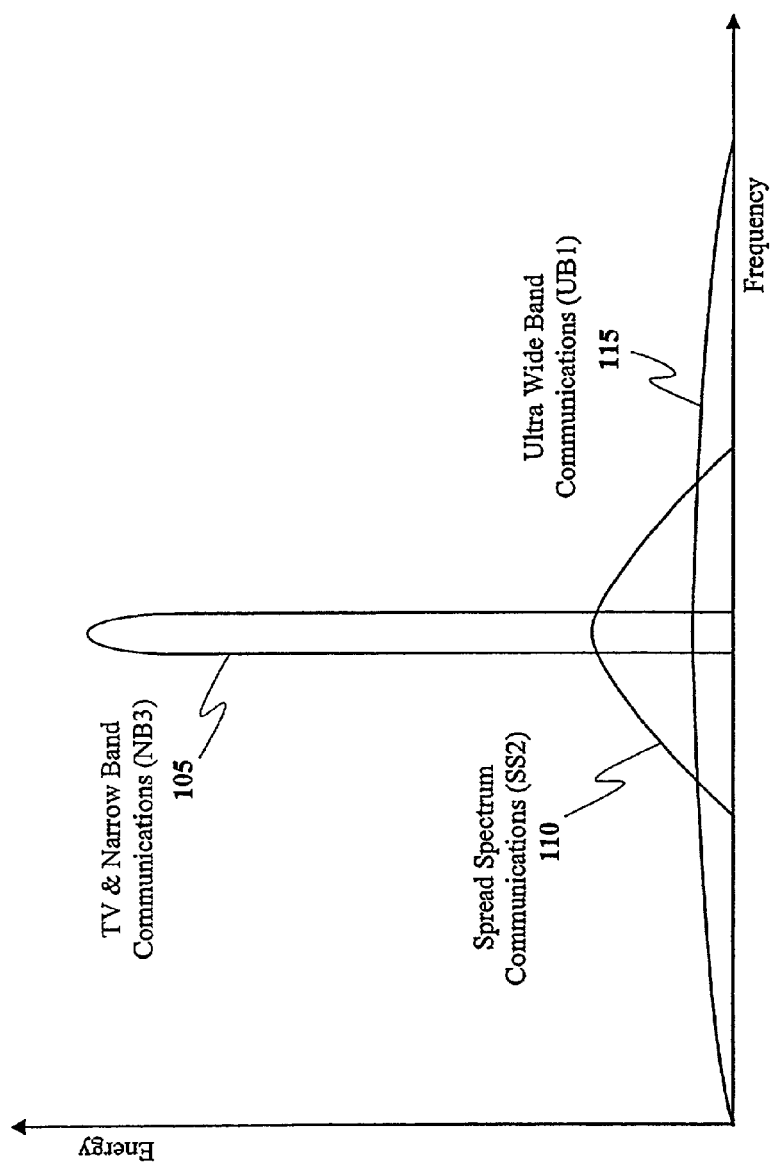
FIG. 1 is a spectral plot that contrasts bandwidths of a narrowband signal, a spread-spectrum signal, and a UWB signal.

As shown in FIG. 1A, one embodiment of the early/late subtractor 520 includes a 180 degree hybrid coupler 1005 and a 0 degree coupler 1010. The 180 degree hybrid coupler 1005 is coupled to the 0 degree coupler through two different length lines, $L_1$ and $L_2$, which forms the desired subtraction function.

As shown in FIG. 10B, another embodiment of the early/late subtractor 520 includes a shorted stub having an impedance $Z_O/2$ that is ½ the impedance $Z_O$ of the main line, and matched source and load impedance. The wave reflected from the short is an inverted and delayed replica that subtracts in the desired manner.

As shown in FIG. 1C, yet another embodiment of the early/late subtractor 520 simply splits the signal into two paths, for example, with a resistive splitter 1020. One path then uses inverting buffer amplifiers 1025 to form a delayed and inverted signal, which is summed with the other path at a coupler 1030 to form the desired subtraction.

Yet another alternative (not shown) is to use three mixers, and delay the LO signal incrementally between the three mixers, with the mid delay being the main mixer (e.g. 555) and the outputs of the other two mixers being combined to form the desired subtraction, effectively providing the same signal as the one coming out of mixer 560 as shown in FIG. 5.

After being mixed in the error channel mixer 560, the resulting error signal is then biased above or below ground by the error channel mixer 560 depending on whether the timing of the LO signal is leading or lagging the input signal. This signal is then passed through the error BP amplifier 568, and is then integrated and sampled in the error channel integrator/sampler circuit 570, and is then digitized in the error channel A/D converter 580, where it is provided to the RCPI 595, which controls a feedback loop through the PFAC 525.

Figure 11B:
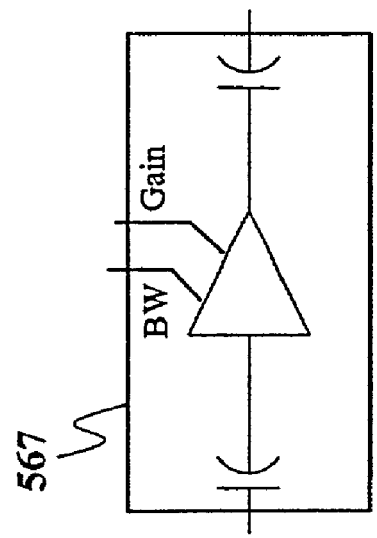
FIGS. 11A and 11B are circuit diagrams showing preferred embodiments of a variable bandwidth amplifiers of FIG. 5 with no gain at DC.
Figure 11A:
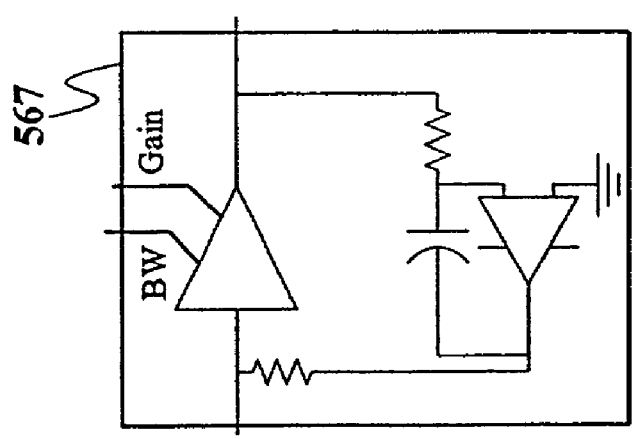

FIGS. 11A and 11B are circuit diagrams showing preferred embodiments of a variable bandwidth amplifiers 567 and 568 with no gain at DC.

Figure 12B:
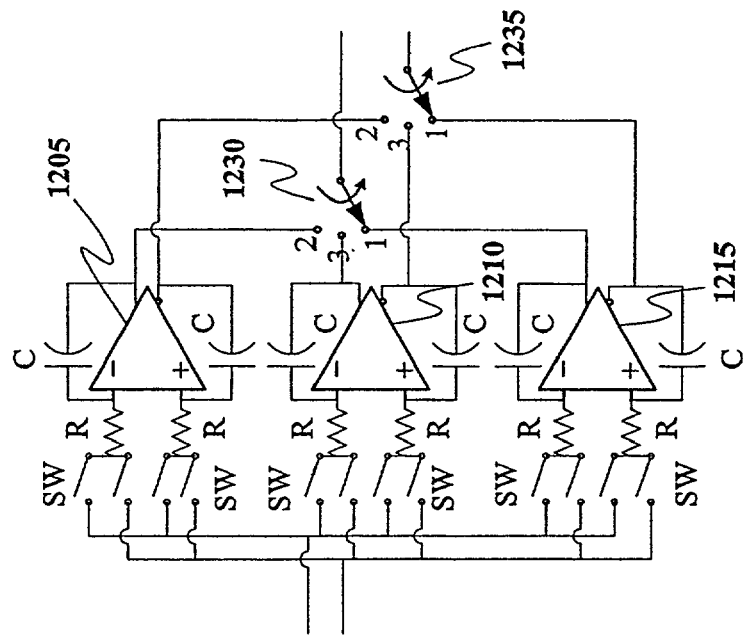
FIGS. 12A, and 12B are circuit diagrams showing preferred embodiments of the integrate and hold blocks of FIG. 5.
Figure 12A:
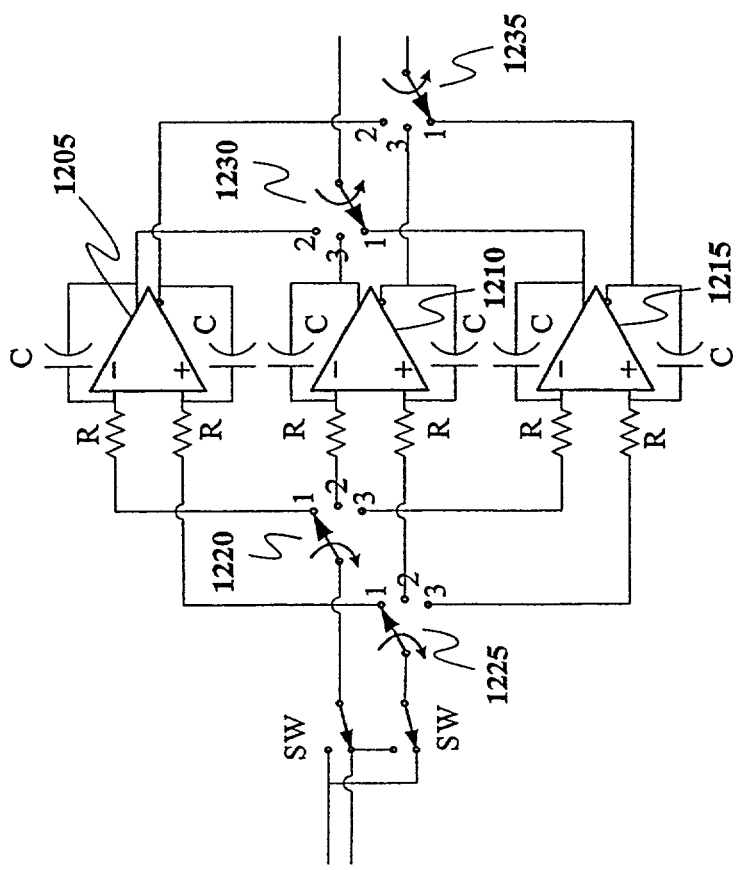

FIGS. 12A and 12B show two embodiments of the integrate/sampler circuits 570 and 575, including the capability of inverting those pieces of the bit that were inverted due to the transmitted code being different from the code used to generate the LO signal. The circuit of FIG. 12A includes first, second, and third integrators 1205, 1210, and 1215, first and second input switches 1220 and 1225, first and second output switches 1230 and 1235, as well as additional switches SW, capacitors C and resistors R. The circuit of FIG. 12B includes first, second, and third integrators 1205, 1210, and 1215, first and second output switches 1230 and 1235, as well as additional switches SW, capacitors C and resistors R.

FIG. 12A shows separately commutating the switches 1220, 1225, 1230, and 1235 to allow the output to be a staircase analog signal with a full bit period for the A/D to capture the value. TABLE 1 shows how the first through third integrators 1205, 1210, and 1215 cycle between the integrate/hold/discharge modes such that the output signal is always switched to the integrator that is in the hold mode. The pair of switches at the input allow the signal to be inverted to undo any inversions made by virtue of the LO signal.

FIG. 12B is similar to FIG. 12A, except that 12 switches are used at the input instead of 8. This allows the advantage of a better-balanced layout, and that the signal need only go through a single output switch 1230 or 1235, instead both an input and an output switch.

TABLE 1 shows the operation of the first through third integrators 1205, 1210, and 1215 in FIGS. 12A and 12B. As shown in Table 1, when the input and output switches 1220, 1225, 1230, and 1235 are in position 1 in either FIG. 12A or 12B, the first integrator 1205 integrates, the second integrator 1210 discharges, and the third integrator 1215 holds. When the switches are in position 2, the first integrator 1205 holds, the second integrator 1210 integrates, and the third integrator 1215 discharges. When the switches are in position 1, the first integrator 1205 discharges, the second integrator 1210 holds, and the third integrator 1215 integrates.

TABLE 1

|  | First Integrator | Second Integrator | Third Integrator |
|---|---|---|---|
| Switch Position 1 | Integrate | Hold | Discharge |
| Switch Position 2 | Discharge | Integrate | Hold |
| Switch Position 3 | Hold | Discharge | Integrate |

Figure 13:
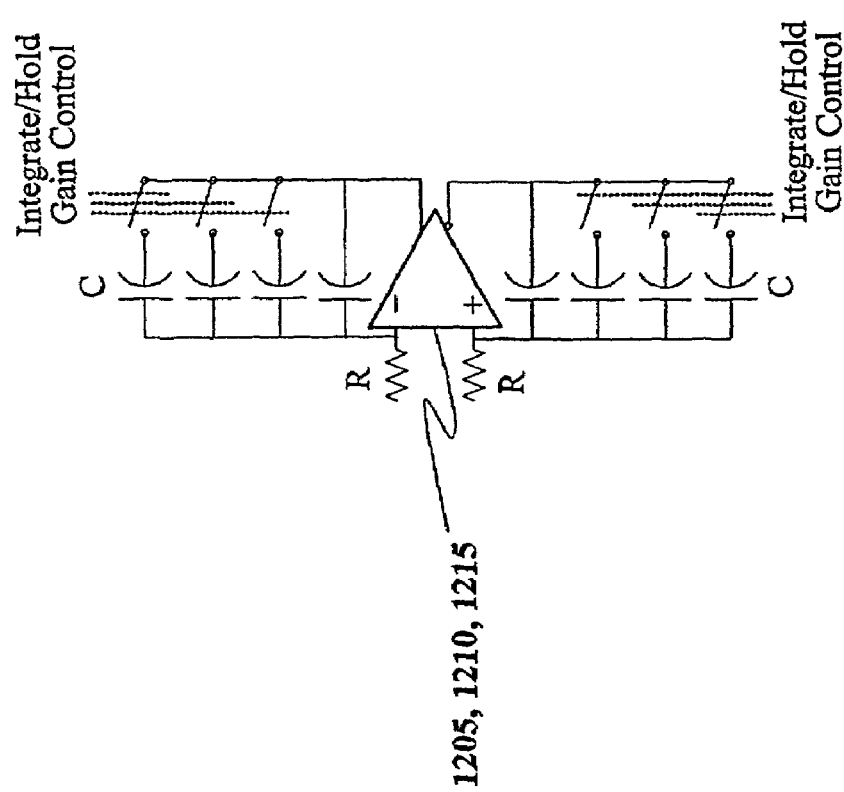
FIG. 13 is a circuit diagram showing a preferred embodiment of the integrate and hold block of FIG. 5 showing a gain setting function.

FIG. 13 shows the integrator with the addition of switched capacitors to adjust the gain.

Figure 14:
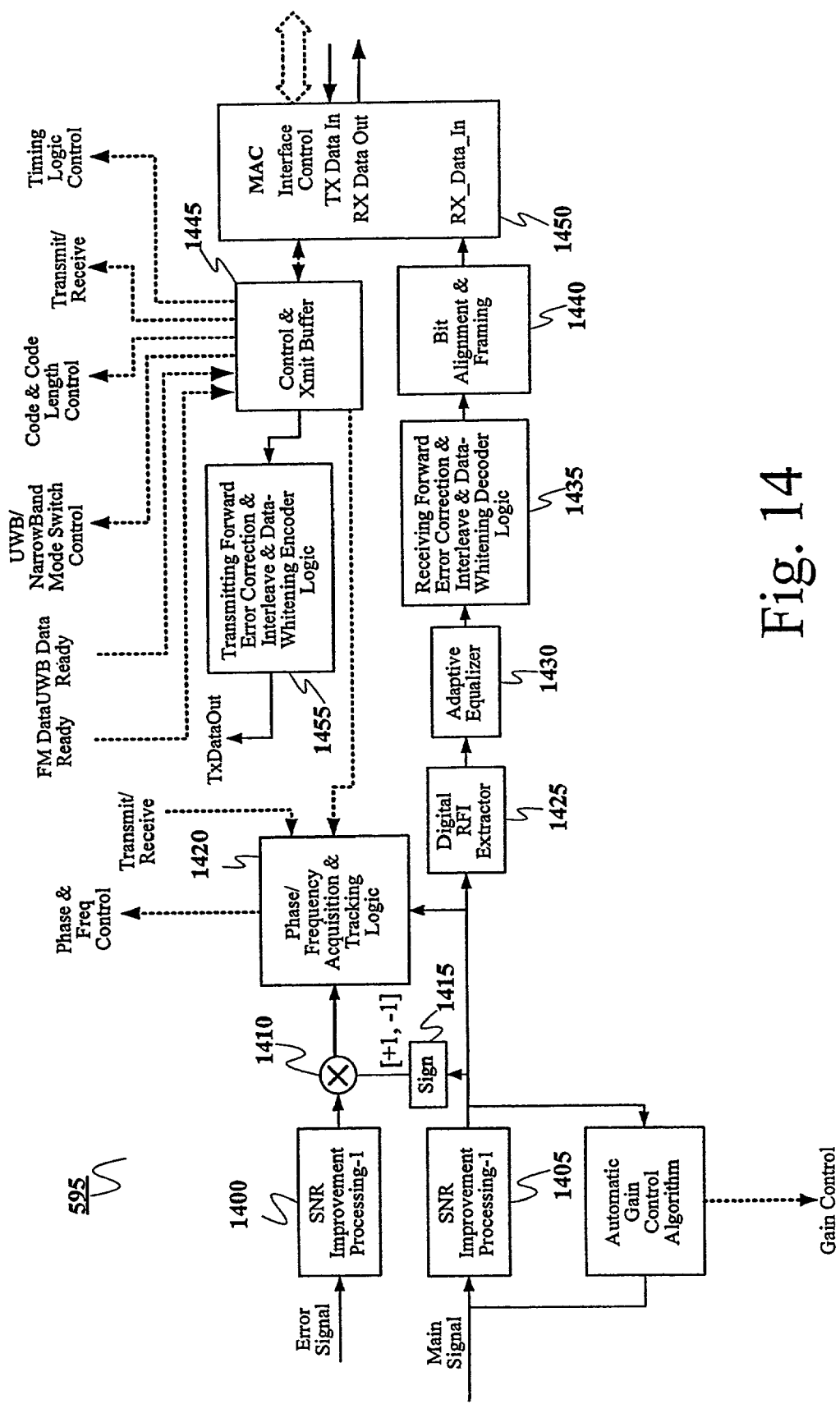
FIG. 14 is a block diagram of a preferred embodiment of the radio controller processor and interface of FIG. 5.

FIG. 14 is block diagram of the RCPI 595 of FIG. 5 according to a preferred embodiment of the present invention. As shown in FIG. 14, the RCPI 595 includes an error SNR improvement processing circuit 1400, a main error SNR improvement processing circuit 1405, a error path mixer 1410, a sign function block 1415, a phase/frequency acquisition and tracking (PFAT) logic circuit 1420, a digital RFI extractor 1425, an adaptive equalizer 1430, a receiving forward error correction and interleave and data whitening decoder logic (FEC&I and DWDL) circuit 1435, a bit alignment and framing logic block 1440, a control and transmit buffer logic block 1445, a media access controller (MAC) block 150, and a transmitting forward error correction and interleave and data whitening encoder logic (FEC&I and DWDL) block 1455.

In operation, the error SNR improvement processing circuit 1400 receives the error signal from the error channel A/D 580 converter, and the main error SNR improvement processing circuit 1405 receives the main signal from the main channel A/D converter 585. These blocks apply additional integration by summing across an integer number of bits, according to a known code. If required, depending on the stability of the integrator/sample circuits and A/D converters, they can estimate residual bias errors and subtract them from the data to improve the raw BER. Depending on the latency through the other algorithms, they can also implement the RFI processing algorithms such as in the digital RFI extractor 1425, the equalizer algorithms such as in the adaptive equalizer 1430, and the FEC etc. as in the FEC&I and DWDL circuit 1435.

The sign block 1415 receives the output from the main error SNR improvement processing circuit 1405 and produces a 1 if the input is positive and a negative 1 if the input is negative to generate a sign signal that is either a +1 or a –1.

The error path multiplier 1410 receives the output of the error SNR improvement processing circuit 1400 and the sign signal from the sign block 1415 and multiplies the two to obtain a signed result. Since the sign of the error signal from the main channel A/D converter 580 alternates with the data, the error path mixer 1410 multiplies the error term by +1 or –1 depending on the data, so that an output error term has the right sign for the feedback loop, independent of the data.

The phase/frequency acquisition and tracking (PFAT) logic circuit 1420 receives the error signal from the error path mixer 1410 and makes phase adjustments until a signal of sufficient BER is found to establish a channel. Once found, PFAT 1420 tracks the incoming signal timing and makes adjustments to the frequency control, so that the system can coast through various data bursts without loosing synchronization.

The digital RFI extractor 1425 receives the output of main SNR improvement processing block 1405 and works to mitigate residual RFI that was not sufficiently filtered out in the previous stages.

The adaptive equalizer 1430 evaluates the intersymbol interference and adaptively finds weights that can be used to remove intersymbol interference. This function is useful in extreme multipath environments such as indoor offices and industrial work areas.

The receiving FEC&I and DWDL circuit 1435 decodes any convolutional and/or block forward error correcting code (FEC), any interleaving that was applied, and any data-whitening function such as a polynomial whitener.

The bit alignment and framing circuit 1440 takes the serial stream of data, looks for the special header sequences that identify the start of frame, etc. and decodes the appropriate header information allowing it to recreate the bytes and data packet out of the stream of bits being sent.

The control and transmit buffer 1445 must accept commands from the MAC 1450 that do things like setting up the registers in the radio that define how it operates, control when reception occurs, when transmissions occur, the parameters and modes to be used at any time, and receive blocks of data that are to be sent.

The transmitting FEC&I and DWDL circuit 1455 does several related things. It encodes the data by adding bits that will allow it to correct for errors. It interleaves the data so that a burst of errors appears to be randomly spaced errors after de-interleaving, which allows the FEC to work better. It also applies a whitening function that prevents the radio from transmitting tones that could interfere with other radio systems. Taken together, they allow the radio to operate more robustly in most environments.

The MAC (Media Access Control) 1450, is the process that establishes the protocol that each radio uses to establish a connection and pass data. It is the interface between the a host computer, for example, and the physical radio.

Returning to FIG. 5, since the sign of the error signal from A/D 580 alternates with the data, the RCPI 595 multiplies the error term by +1 or –1 depending on the data, so that an output error term has the right sign for the feedback loop, independent of the data (see the error path mixer 1410 in FIG. 14).

The signal received at the antenna 505 may be a UWB signal or another kind of signal, e.g., a Bluetooth (BT) signal. Bluetooth signals employ a frequency shift keyed (FSK) modulation on top of a frequency hopped spread spectrum (FHSS) modulation scheme. It operates in the industrial-scientific-medical (ISM) band (2.4 to 2.5 GHz), detailed features of which are discussed in "Specification of the Bluetooth System", v1.0b, Dec. 1, 1999, Core-Specification-Volume 1, Profiles Specification-Volume 2, the entire contents of which are incorporated herein by reference, and are available at www.bluetooth.com. This specification is currently in the process of becoming the IEEE 802.15.1 standard. Like UWB, the Bluetooth radio uses time domain duplex (TDD) so as to make the hardware simpler since components can be time-shared between the transmitter and receiver functions. This feature saves power and cost.

In this transceiver 500, either UWB signal energy or energy from another type of waveform (e.g., from a Bluetooth (BT) waveform) is received through the antenna 505. When the antenna switch 510 is set to pass the received signal through the front end 515, the transceiver is in the receive mode. When the antenna switch 510 is set to connect the antenna to the first signal switch 530, the transceiver is in the transmit mode and the first signal switch 530 is set to connect the antenna to the second signal switch 535.

The second signal switch 535 is set to connect the antenna to the UWB PFN 500, if the transceiver is in UWB mode, or it is set to connect the antenna to the phase/frequency agile clock and FM encoder, via divider 540, if the transceiver is in a conventional mode. So the same PFAC is used for (1) driving the PFN timing in a UWB receive mode, (2) driving the PFN timing in a UWB transmit mode, (3) generating FSK and frequency hop or other FM modulation signals for receiving in a BT or other NB mode, and (4) generating FSK and frequency hop or other FM modulation signals for transmitting in a BT or other NB mode. These four options are determined by the settings of the first and second signal switches 530 and 535.

Both the first and second dividers 540 and 545, as well as the first and second signal switches 530 and 535 cooperate with one another under the control of a processor (in the RCPI 595 in this embodiment, as shown in more detail in FIG. 14) to configure the transceiver 500 to operate either in a UWB mode of operation or in another receive mode of operation (such as Bluetooth).

In this circuit, the risk of direct conversion reception is mitigated by the use of a phase/frequency agile clock and FM encoder 525 that operates at a higher frequency than the frequency that is actually applied to the mixer main channel mixer 555. This way, energy that is produced by clock 525, is out of band, and only the divided down frequency at the output of 540 may couple into the antenna 505 via a leakage path $L_1$. This leakage is kept to a minimum by confining this divided down signal. It is possible to limit the line length as well as the active circuitry required. It is also possible to use an intermediate frequency at the output of main mixer 555 as long as all spectral terms can be captured in the Nyquist bandwidth of sampler 575 and A/D 585. Because the bit rate of the UWB radio is often in excess of 100 Mbps, A/D 585 will typically have a Nyquist bandwidth extending to 50 MHz, making IF sampling easy to accomplish. By using IF sampling, all demodulation is done digitally were it can be programmed and changed to meet demands unforeseen at the time the radio is engineered.

Another technique employed by the present invention to mitigate the effect of self-interference is described with reference to the waveforms of FIGS. 6A–6E. FIG. 6A shows an exemplary RF UWB signal that may be received by the receiver antenna 505 of FIG. 5 and ultimately provided to the input of the main channel mixer 555. As can be seen, the pattern of received wavelets shows two non-inverted wavelets 601, 602, followed by an inverted wavelet 603, followed by a non-inverted wavelet 604 (i.e. a 1101 digital pattern).

If the signal provided by PFN 550 to the main channel mixer 555 has the same phase as the received RF signals, then the signal provided by the PFN 550 would appear as shown in FIG. 6B. As shown in FIG. 6B, the pattern of generated wavelets shows two non-inverted wavelets 611, 612, followed by an inverted wavelet 613, followed by a non-inverted wavelet 614, i.e., a signal identical to the signal in FIG. 6A.

FIG. 6C shows an example of the signal output from the main channel mixer 555 and input to the main channel integrator/sampler 575 when the main channel mixer 555 receives the two signals shown in FIGS. 6A and 6B. As can be seen in FIG. 6C, all of the energy in the signal of FIG. 6C has the same sign. (In this example it includes four positive terms 621, 622, 623, and 624.) This means that the integration result from the main channel integrator/sampler 575 will monotonically increase (in a noiseless case) and thus will always rise above 0 volts before detection is made.

As recognized by the present inventor, the local oscillator leakage problem is a limitation of this positively sloped integration approach. If there is leakage along the leakage path $L_1$ that couples PFN 550 with the antenna 505 (See FIG. 5), an unintended in-band signal may be generated that influences the integration process. The leakage signal is coherent with the desired signal and tends to bias the integration signal arbitrarily positively or negatively depending on the phase of the leakage term and its alignment with the LO signal.

In addition, the main channel mixer 555 itself will have a bias term that tends to drift. Thus, if the energy through the leakage path $L_1$ moves as a function of the reflection obstacle with which it interacts, it causes fairly significant "noisy" integration results. Noisy integration in turn increases likelihood of bit-errors, thus limiting performance, often severely.

A technique for counteracting the self-interference is to periodically invert a set number of wavelets. FIGS. 6D and 6E shows an example where the second half of the wavelets are inverted. In particular, FIG. 6D takes the signal shown in FIG. 6A and inverts last pair of wavelets.

As shown in FIG. 6D, the pattern of generated wavelets shows two non-inverted wavelets 601, 602, followed by a non-inverted wavelet 633, followed by an inverted wavelet 644. The third and the fourth wavelets 633 and 634 are inverted with regard to the third and fourth wavelets 603 and 604 shown in FIG. 6A. It should be noted, however, that although this embodiment shows a pair of wavelets being inverted, the number of inverted wavelets and the frequency of inversion may be varied as desired.

As a consequence of this wavelet inversion, the integration waveform, as shown in FIG. 6E, will have two positive terms 651 and 652, followed by two negative terms 653 and 654. In this embodiment, if energy does leak back through the antenna (310, 460, 505), the leakage will still tend to integrate to a DC term. But the key is that the amplifiers do not pass DC. So even if there is a leakage term, it is blocked so that it cannot affect the bit decisions. Consequently, the risk of a floating bias is reduced by this self-leveling technique because the bias term is destroyed.

The effect of the inversion, however, must be undone, because as it stands, the desired signal integrates to zero. This can be undone in several ways. First, the integrator/sample circuits 570 and 575, along with A/D's 580, and 585 can be clocked at twice the bit clock. In this case, the first sample is the integral of the first half of a bit, and the second sample is the negative integral of the second half of a bit. By simply subtracting the second sample from the first, the integral of the full bit is obtained, and at the same time, any DC offset or temporary bias is canceled. The advantage of this approach is that the DC offset and 1/f noise all the way into the A/D's is canceled. The disadvantage is that the A/D had to run at twice the speed, which raises the power consumption.

A second way to undo the inversion, is to invert the last half of the signal just prior in the integrator/sample circuits. This way, not only is the leakage term destroyed in the amplifiers that do not pass DC, but 1/f noise in the active and passive devices is also canceled immediately prior to the integrator, which provides the detected value. By the time the signal is integrated, its value is typically much higher than the residual noise. As a result, the loss of using this approach as opposed to doubling the A/D clock is minimal.

Fundamentally, the inversion process moves the desired signal energy away from DC and to the first, third, and fifth etc. harmonics of the bit clock, because the signal of interest is essentially a square wave as opposed to DC. Since most of the energy is in the first and third harmonics, the amplifiers 567 and 568, after mixers 555 and 560, need only pass, for example, 300 MHz signals, even though the original signal may have had 4 GHz of bandwidth. Since it is much easier at low frequencies to get high gain without oscillations, low noise and low power, as opposed to at 3 to 7 GHz for example, this technique makes for a much simpler and better performing radio. Furthermore, it lends itself to direct IF sampling receiver architectures so that a software defined multi-mode radio can be built with very little additional circuitry.

Thus, using the inversion technique shown in FIG. 6D reduces the effect of bias terms that arise because of an LO leakage path, and the bias terms that may be present with main channel mixer 555, as well as low frequency noise in the following amplifier chains such as 567 and 568, and at the same time adds the capability to provide a software defined multi-mode (i.e. AM, FM, PSK, FSK, QPSK, QAM, etc.) radio.

Figure 7:
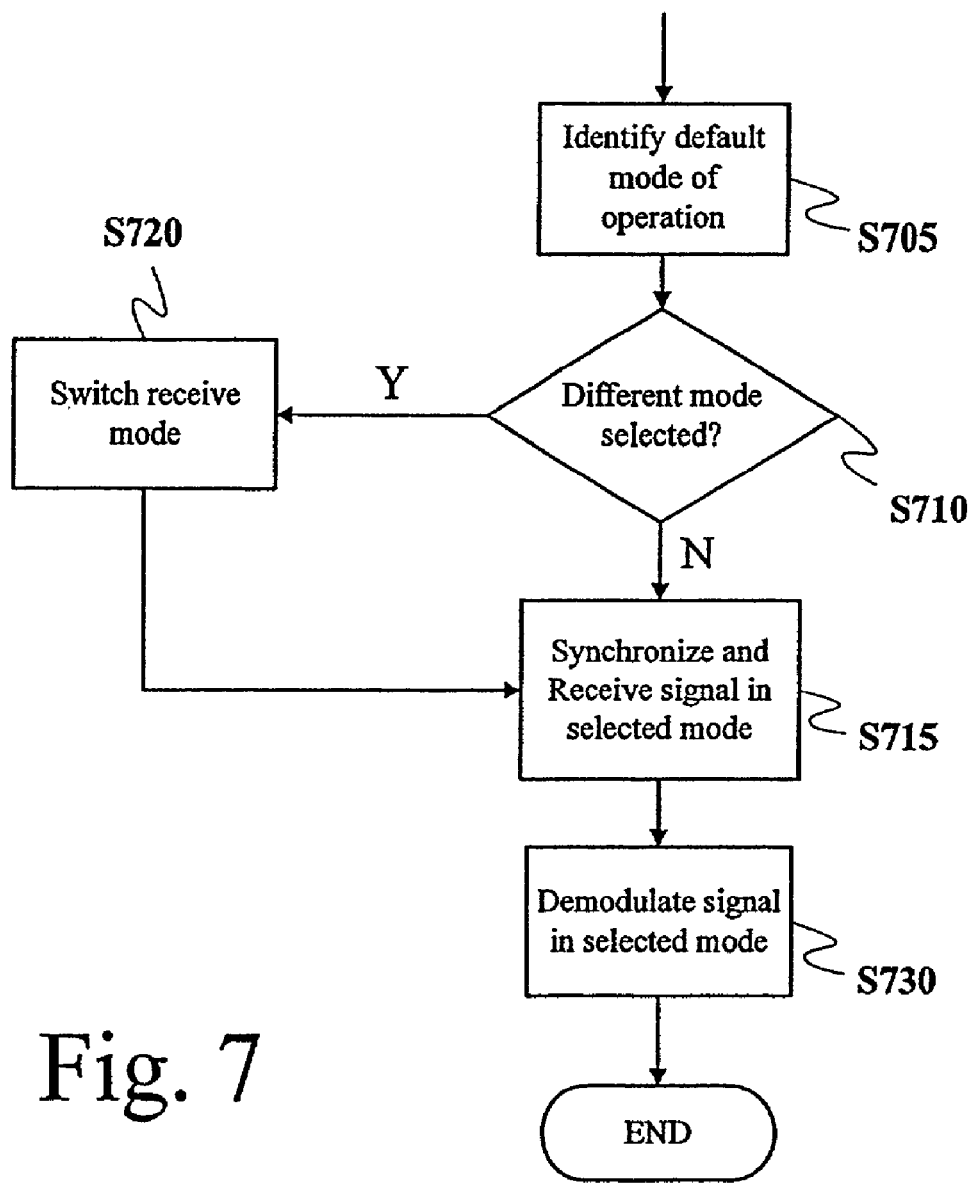
FIG. 7 is a flow chart showing a method for selecting different modes of operation according to a preferred embodiment of the present invention.

FIG. 7 is a flow chart showing a process for selecting different modes of operation according to a preferred embodiment of the present invention. The process begins in step S705 where a controller employed in the transceiver identifies a default mode of operation. In the present preferred embodiment the default mode is a UWB mode of operation, though this could vary for alternate embodiments.

Then in step S710, a query is made regarding whether another mode of operation is selected. In alternate embodiments, this could be achieved by receiving a signal indicating that the transceiver has identified a received signal as a non-UWB signal, or could be done through user selection.

The exact mode of operation that will be used to receive the signal is determined by steps S710 and S720. If the response to the inquiry in step S710 is negative, the default mode of operation is used and the process proceeds directly to step S715 without selecting a different mode. If, however, the response to the inquiry in step S710 is affirmative, a different mode of operation is necessary, and so the process first proceeds to step S720 where the mode is switched from the default mode to the other selected mode before proceeding to step S715. Regardless, the signal is received in step S715 in the selected mode, whether that is the default mode or an alternate mode.

After the signal is received in step S715, either in the default mode or a newly-selected mode, a self-interference mitigation operation is performed in step S725. Subsequently, the signal is decoded in step S730 and the process ends.

In step S715, if in the UWB mode, the PFN 550 purposefully produces predetermined groups of wavelets that are inverted with respect to the wavelets that are expected to be received. Preferably, the number of inverted wavelets is equal in number to an adjacent set of non-inverted wavelets so that the integrator will tend to produce a zero integration result when integrating over both the inverted wavelets and non-inverted wavelets.

Figure 8:
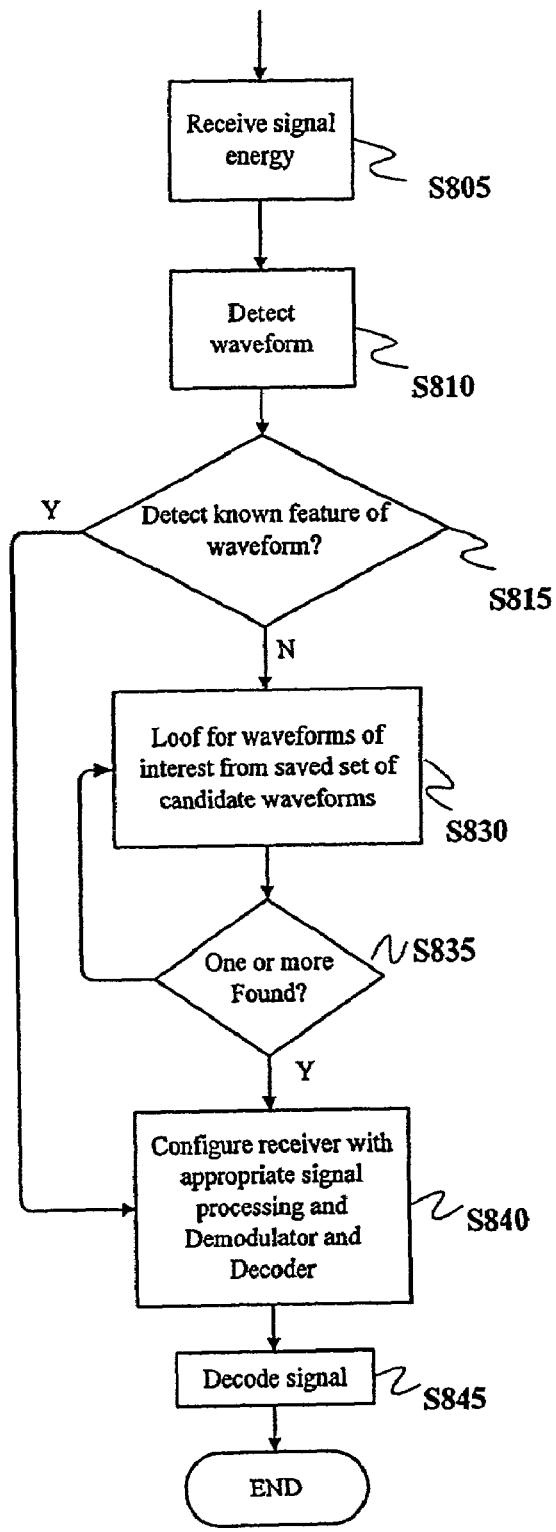
FIG. 8 is a flow chart showing another method for automatically determining a type of waveform received by the receiver and a mechanism for configuring the receiver to properly receive that waveform according to another preferred embodiment of the present invention.

FIG. 8 shows an alternate technique where the waveform itself is detected in order to determine what mode of operation in which this receiver will operate. This functionality is advantageous since users would not need to concern themselves with setting anything on the radio. It would just power up and work. The process begins in step S805 where signal energy is received at the antenna (310, 460, 505).

Then in step S810, the particular type of waveform contained at the received signal energy is detected.

In step S815, an inquiry is made whether the detected waveform is known. If the response to the inquiry in step S815 is negative, the process proceeds to step S830 where the radio cycles through waveforms of interest, with priority emphasis if desired, cycling in a loop through inquiry block S835 until a desired signal is found, and step S840 is started. In step S840 the receiver is configured based on the detected waveform to form the appropriate signal processing, demodulator, and decoder. Once the configuration is complete, step S845 is started, where the signal is decoded and the link is established. If, however, the response to the inquiry in step S815 is affirmative, the process proceeds directly to step S840.

The UWB transceiver of FIGS. 3 and 4 may be used to perform a radio transport function for interfacing with different applications as part of a stacked protocol architecture. In such a configuration, the UWB transceiver performs signal creation, transmission, and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology.

Thus, the UWB transceiver of FIG. 3 may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

Figure 9:
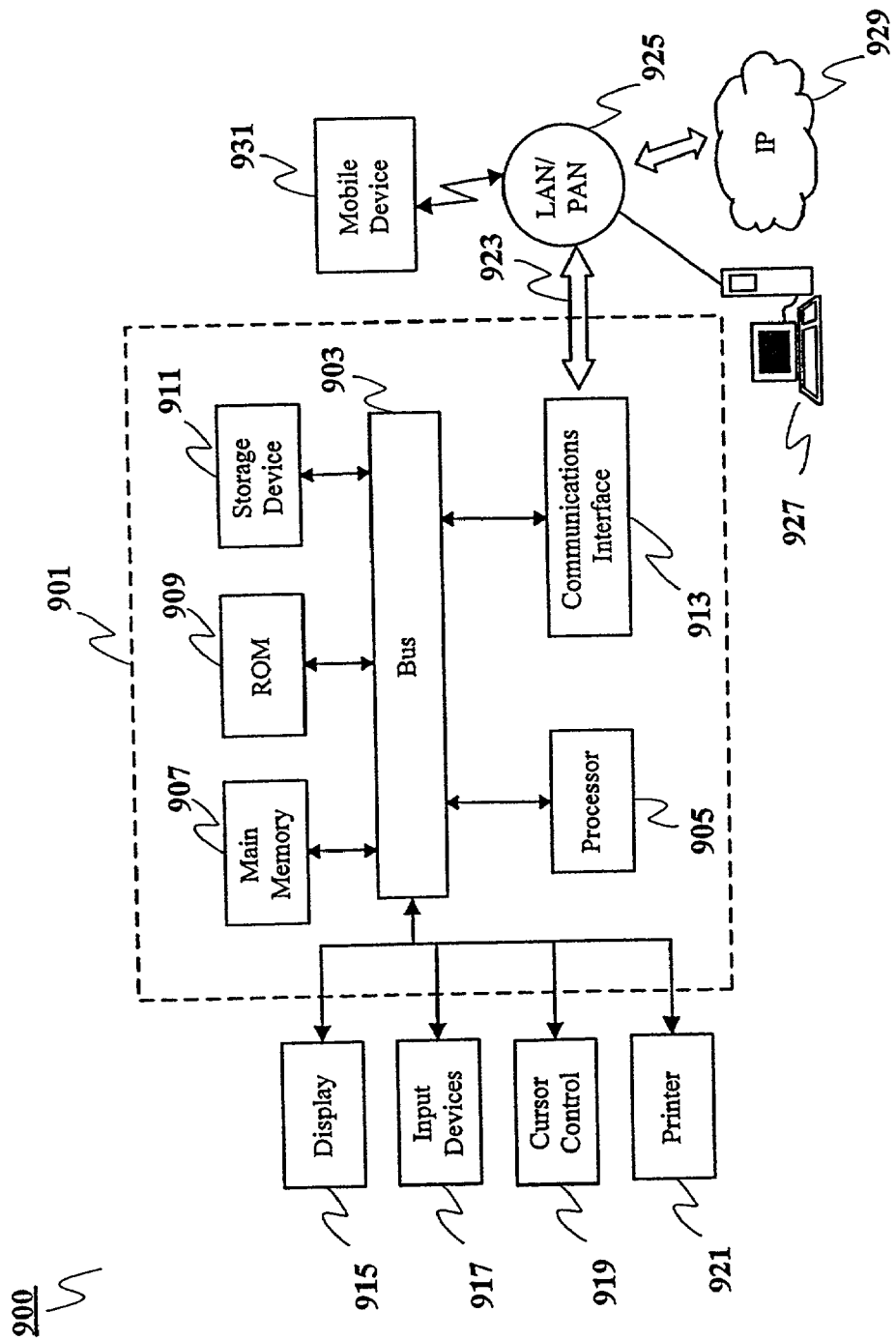
FIG. 9 is a block diagram of a processor system upon which preferred embodiments of the present invention may be implemented.

FIG. 9 illustrates a processor system 900 according to a preferred embodiment of the present invention. In this embodiment, the processor system 900 includes a processor unit 901, a display 915, one or more input devices 917, a cursor control 919, a printer 921, a network link 923, a communications network 925, a host computer 927, an Internet Protocol (IP) network 929, and a mobile device 931. The processor unit 901 includes a bus 903, a processor 905, a main memory 907, a read only memory (ROM) 909, a storage device 911, and a communication interface 913. Alternate embodiments may omit various elements.

The bus 903 operates to communicate information throughout the processor unit. It is preferably a data bus or other communication mechanism for communicating information.

The processor 905 is coupled with the bus 903 and operates to process the information.

The main memory 907 may be a random access memory (RAM) or other dynamic storage device (e.g., dynamic RAM (DRAM), static RAM (SRAM), synchronous DRAM (SDRAM), flash RAM). It is preferably coupled to the bus 903 for storing information and instructions to be executed by the processor 905. In addition, a main memory 907 may be used for storing temporary variables or other intermediate information during execution of instructions to be executed by the processor 905.

The ROM 909 may be a simple read-only memory, or may be another kind of static storage device (e.g., programmable ROM (PROM), erasable PROM (EPROM), and electrically erasable PROM (EEPROM)). It is coupled to the bus 903 and stores static information and instructions for the processor 905.

The storage device 911 may be a magnetic disk, an optical disc, or any other device suitable for storing data. It is provided and coupled to the bus 903 and stores information and instructions.

The processor unit 901 may also include special purpose logic devices (e.g., application-specific integrated circuits (ASICs)) or configurable logic devices (e.g., simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high-density media drives, may be added to the processor unit 901 using an appropriate device bus (e.g., a small system interface (SCSI) bus, an enhanced integrated device electronics (IDE) bus, or an ultra-direct memory access (DMA) bus). The processor unit 901 may additionally include a compact disc reader, a compact disc reader-writer unit, or a compact disc jukebox, each of which may be connected to the same device bus or another device bus.

The processor system 901 may be coupled via the bus 903 to the display 915. The display unit may be a cathode ray tube (CRT), a liquid crystal display (LCD), or any other suitable device for displaying information to a system user. The display 915 may be controlled by a display or graphics card.

The processor system 901 is also preferably connected to the one or more input devices 917 and a cursor control 919 for communicating information and command selections to the processor 905. The one or more input devices may include a keyboard, keypad, or other device for transferring information and command selections. The cursor control 919 may be a mouse, a trackball, cursor direction keys, or any suitable device for communicating direction information and command selections to the processor 905 and for controlling cursor movement on the display 915.

In addition, a printer 921 may provide printed listings of the data structures or any other data stored and/or generated by the processor system 901.

The processor unit 901 performs a portion or all of the processing steps of preferred embodiments of the present invention in response to the processor 905 executing one or more sequences of one or more instructions contained in a memory, such as the main memory 907. Such instructions may be read into the main memory 907 from another computer-readable medium, such as a storage device 911. One or more processors in a multi-processing arrangement may also be employed to execute the sequences of instructions contained in the main memory 907. In alternative embodiments, hard-wired circuitry may be used in place of or in combination with software instructions. Thus, embodiments are not limited to any specific combination of hardware circuitry and software.

As stated above, the processor unit 901 includes at least one computer readable medium or memory programmed according to the teachings of the invention and for containing data structures, tables, records, or other data described herein. Stored on any one or on a combination of computer readable media, the present invention includes software for controlling the system 901, for driving a device or devices for implementing the invention, and for enabling the system 901 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 905 for execution. A computer readable medium may take many forms, including but not limited to, non-volatile media, volatile media, and transmission media. Non-volatile media includes, for example, optical, magnetic disks, and magneto-optical disks, such as the storage device 911. Volatile media includes dynamic memory, such as the main memory 907. Transmission media includes coaxial cables, copper wire and fiber optics, including the wires that comprise the bus 903. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 905 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 901 may receive the data on the telephone line and use an infrared transmitter to convert the data to an infrared signal. An infrared detector coupled to the bus 903 can receive the data carried in the infrared signal and place the data on the bus 903. The bus 903 carries the data to the main memory 907, from which the processor 905 retrieves and executes the instructions. The instructions received by the main memory 907 may optionally be stored on a storage device 911 either before or after execution by the processor 905.

The communications interface 913 provides a two-way UWB data communication coupling to a network link 923, which is connected to the communications network 925. The communications network 925 may be a local area network (LAN), a personal area network (PAN), or the like. For example, the communication interface 913 may be a network interface card and the communications network may be a packet switched UWB-enabled PAN. As another example, the communication interface 913 may be a UWB accessible asymmetrical digital subscriber line (ADSL) card, an integrated services digital network (ISDN) card, or a modem to provide a data communication connection to a corresponding type of communications line.

The communications interface 913 may also include the hardware to provide a two-way wireless communications coupling other than a UWB coupling, or a hardwired coupling to the network link 923. Thus, the communications interface 913 may incorporate the UWB transceiver of FIG. 1 or FIG. 8 as part of a universal interface that includes hardwired and non-UWB wireless communications coupling to the network link 923.

The network link 923 typically provides data communication through one or more networks to other data devices. For example, the network link 923 may provide a connection through a LAN to the host computer 927 or to data equipment operated by a service provider, which provides data communication services through the IP network 929. Moreover, the network link 923 may provide a connection through the communications network 925 to the mobile device 931, e.g., a personal data assistant (PDA), laptop computer, or cellular telephone.

The communications network 925 and IP network 929 both preferably use electrical, electromagnetic, or optical signals that carry digital data streams. The signals through the various networks and the signals on the network link 923 and through the communication interface 913, which carry the digital data to and from the system 901, are exemplary forms of carrier waves transporting the information. The processor unit 901 can transmit notifications and receive data, including program code, through the communications network 925, the network link 923, and the communication interface 913.

Obviously, numerous modifications and variations of the present invention are possible in light of the above teachings. It is therefore to be understood that within the scope of the appended claims, the invention may be practiced otherwise than as specifically described herein.

I claim:

1. A self-noise cancellation mechanism for reducing performance degradation as a result of self-generated noise, comprising:
   a pulse-forming network for producing an internally-generated ultrawide bandwidth (UWB) bi-phase signal having a first arranged pattern;
   a mixer for combining the UWB bi-phase signal with an incoming Radio Frequency (RF) UWB signal having a second set pattern; and
   an integrator for accumulating an output of the mixer,
   wherein the first arranged pattern comprises a first set of hi-phase wavelets and an adjacent second set of bi-phase wavelets,
   wherein the second arranged pattern comprises a third set of bi-phase wavelets and an adjacent fourth set of hi-phase wavelets,
   wherein the first set of bi-phase wavelets and the third set of hi-phase wavelets are the same in wave shape and polarity, and
   wherein the second set of hi-phase wavelets and the fourth set of hi-phase wavelets are the same in wave shape, hut are inverted in polarity.

2. The self-noise cancellation mechanism as recited in claim 1, wherein the first and third sets of hi-phase wavelets each comprise two wavelets.

3. The self-noise cancellation mechanism as recited in claim 1, wherein the second and third sets of bi-phase wavelets each comprise two wavelets.

4. The self-noise cancellation mechanism as recited in claim 1, wherein the first, second, third, and fourth sets of bi-phase wavelets all have equal number of wavelets.

5. The self-noise cancellation mechanism as recited in claim 1, further comprising an antenna for receiving the incoming RF UWB signal.

6. The self-noise cancellation mechanism as recited in claim 5, further comprising a front end circuit located between the antenna and the mixer for processing the incoming RF UWB signal.

7. The self-noise cancellation mechanism as recited in claim 6, wherein the front end circuit includes one of a low noise amplifier, an automatic gain control circuit, and a stub circuit.

8. The self-noise cancellation mechanism as recited in claim 1, further comprising an analog-to-digital converter for converting the output of the integrator into a digital signal.

9. The self-noise cancellation mechanism in a radio receiver, comprising:
   means for producing an internally-generated ultrawide bandwidth (UWB) bi-phase signal having a first arranged pattern;
   means for receiving an incoming Radio Frequency (RF) signal having a second arranged pattern;
   means for combining the internally-generated UWB bi-phase signal and the incoming RF signal to produce an output; and
   means for integrating the output of the combining means over a length of time that corresponds with the first and second arranged patterns such that an integration output approaches zero when the incoming RF signal is aligned in phase with the internally-generated UWB bi-phase signal,
   wherein a first portion of the first arranged pattern is substantially the same in shape and is the same in polarity with respect to a third portion of the second arranged pattern, and
   wherein a second portion of the first arranged pattern is substantially the same in shape and inverted in polarity with respect to a fourth portion of the second arranged pattern.

* * * * *